(12) United States Patent
Picker

(10) Patent No.: US 9,585,191 B2
(45) Date of Patent: Feb. 28, 2017

(54) MOBILE BASE STATION

(71) Applicant: Redline Innovations Group Inc., Markham (CA)

(72) Inventor: Dan Picker, San Diego, CA (US)

(73) Assignee: Redline Communications Inc., Markham (CA)

( * ) Notice: Subject to any disclaimer, the term of this patent is extended or adjusted under 35 U.S.C. 154(b) by 59 days.

(21) Appl. No.: 14/097,475

(22) Filed: Dec. 5, 2013

(65) Prior Publication Data

US 2014/0092803 A1  Apr. 3, 2014

Related U.S. Application Data

(63) Continuation-in-part of application No. 13/219,690, filed on Aug. 28, 2011, now Pat. No. 8,634,339.

(51) Int. Cl.
| | |
|---|---|
| *H05B 7/14* | (2006.01) |
| *H04J 1/10* | (2006.01) |
| *H04J 3/08* | (2006.01) |
| *H04W 84/00* | (2009.01) |
| *H04W 16/26* | (2009.01) |
| *H04W 16/10* | (2009.01) |
| *H04W 88/10* | (2009.01) |
| *H04W 92/04* | (2009.01) |

(52) U.S. Cl.
CPC ......... *H04W 84/005* (2013.01); *H04W 16/10* (2013.01); *H04W 16/26* (2013.01); *H04W 88/10* (2013.01); *H04W 92/045* (2013.01)

(58) Field of Classification Search
CPC .... H04W 88/04; H04W 16/26; H04B 7/2606; H04B 7/155; H04L 2001/0097
USPC .................................................. 370/315–316
See application file for complete search history.

(56) References Cited

U.S. PATENT DOCUMENTS

| | | | | |
|---|---|---|---|---|
| 5,642,122 A | * | 6/1997 | Lockie | B64G 1/22 343/881 |
| 6,816,706 B1 | * | 11/2004 | Hohnstein | H01Q 1/06 455/16 |
| 7,299,069 B2 | | 11/2007 | Claussen | |
| 7,349,665 B1 | * | 3/2008 | Zhu et al. | 455/11.1 |
| 7,502,355 B2 | * | 3/2009 | Bednekoff | H04B 1/18 370/328 |

(Continued)

FOREIGN PATENT DOCUMENTS

| | | |
|---|---|---|
| WO | WO9639002 | 12/1996 |
| WO | WO2005067324 | 7/2005 |
| WO | WO2013030834 | 3/2013 |

*Primary Examiner* — Mark Rinehart
*Assistant Examiner* — Sanjay K Dewan
(74) *Attorney, Agent, or Firm* — Nixon Peabody LLP

(57) ABSTRACT

Various embodiments of electronic communication systems and methods in which an infrastructure in-motion adapts from a first set of communication parameters to a second set of communication parameters while moving from one geographical region to a second geographical region, and associated transmission pattern of the infrastructure in-motion may be modified to either avoid a problem of multiple-region-coverage or to resolve such a problem once it has arisen. The infrastructure in-motion may be a base station or other infrastructure, and any or all of multiple techniques such as beam switching, beam selection, phased array, and null-steering, may be used to modify a transmission pattern. In various alternative embodiments, infrastructure in-motion in one geographical region establishes a first backhaul link with a first core network, moves to a second geographical region, and then establishes a second backhaul ink with a second core network.

13 Claims, 26 Drawing Sheets

(56) References Cited

U.S. PATENT DOCUMENTS

| | | | |
|---|---|---|---|
| 7,962,145 B2* | 6/2011 | Gale et al. ................... 455/450 |
| 8,463,177 B2 | 6/2013 | Gavrilovich |
| 9,100,707 B2* | 8/2015 | Fan ................... H04N 21/2547 |
| 2003/0032454 A1* | 2/2003 | Judd ..................... H01Q 1/246 455/562.1 |
| 2003/0093187 A1* | 5/2003 | Walker ............................. 701/1 |
| 2004/0137924 A1* | 7/2004 | Herscovich ........... H04B 7/061 455/500 |
| 2005/0065682 A1* | 3/2005 | Kapadia et al. ................ 701/35 |
| 2007/0232299 A1* | 10/2007 | Alcorn .............. H04B 7/18506 455/431 |
| 2007/0281705 A1* | 12/2007 | Bosenbecker ................ 455/445 |
| 2008/0299965 A1* | 12/2008 | Lagerman .......... H04B 7/18506 455/431 |
| 2009/0029645 A1* | 1/2009 | Leroudier .......................... 455/7 |
| 2009/0098850 A1* | 4/2009 | Deaton et al. ............ 455/404.1 |
| 2009/0279490 A1* | 11/2009 | Alcorn .............. H04B 7/18506 370/329 |
| 2010/0165945 A1* | 7/2010 | Labedz ................ H04L 5/0005 370/330 |
| 2010/0190533 A1* | 7/2010 | Black et al. .................. 455/571 |
| 2011/0003563 A1* | 1/2011 | Gorbachov .................... 455/78 |
| 2011/0149885 A1* | 6/2011 | Bachu et al. ................ 370/329 |
| 2011/0307932 A1* | 12/2011 | Fan ................... H04N 21/2547 725/110 |
| 2013/0059585 A1 | 3/2013 | Giloh |
| 2013/0272219 A1* | 10/2013 | Singh et al. .................. 370/329 |
| 2013/0324070 A1* | 12/2013 | Bennett ............. H04B 7/18506 455/404.1 |
| 2014/0066088 A1* | 3/2014 | Bhattacharya et al. ... 455/456.1 |

* cited by examiner

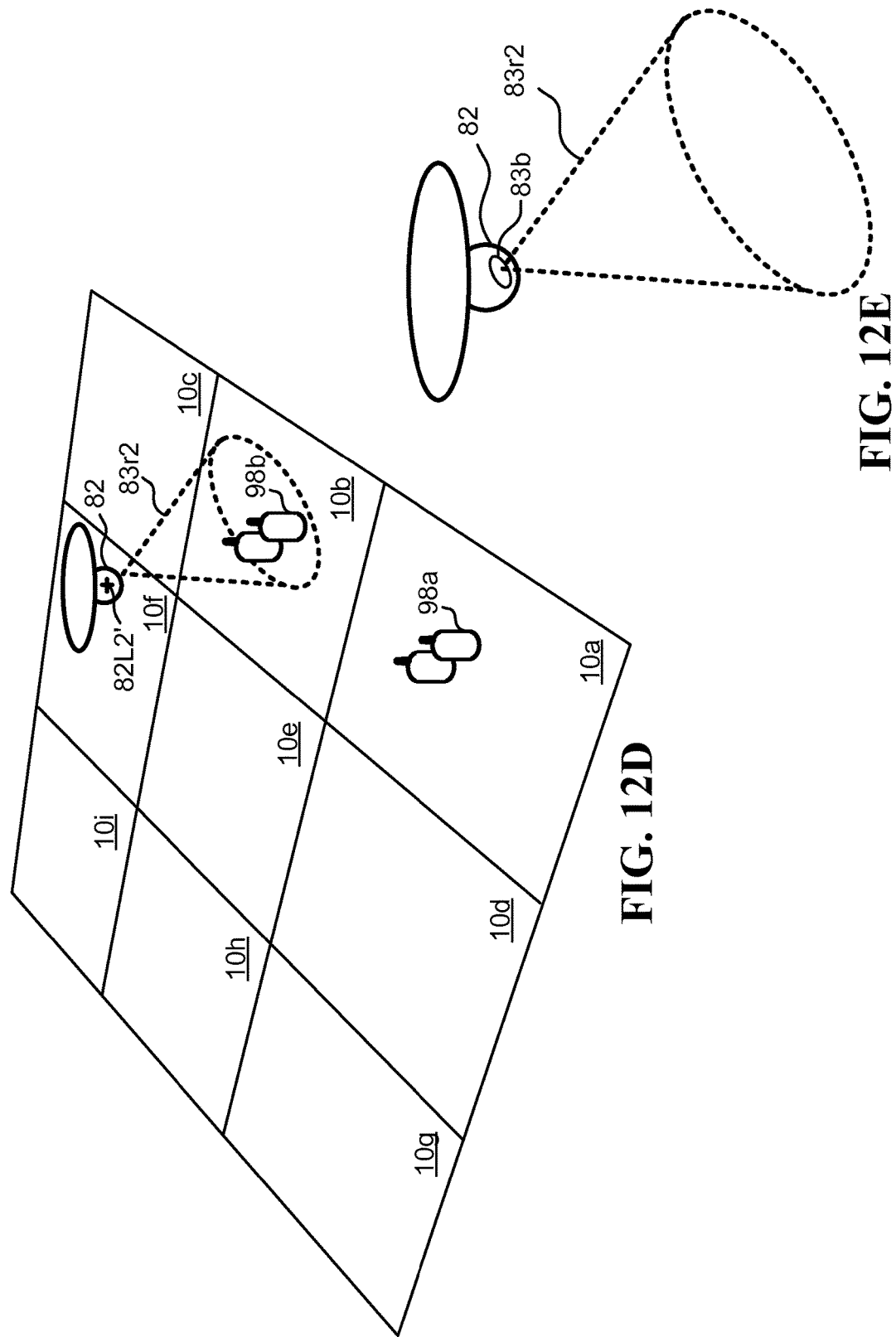

MOBILE BASE STATION

CROSS-REFERENCE TO RELATED APPLICATIONS

This application is a continuation-in-part of application Ser. No. 13/219,690, filed on Aug. 28, 2011.

BACKGROUND

In many electronic communication systems, the infrastructure is geographically fixed, and services consumer client units which are either mobile or portable. The infrastructure includes at least base stations and a network control center. Although in some systems the infrastructure is geographically fixed, alternative systems can be imagined in which base stations move, while continuing to serviced consumer client units that may be mobile, portable, or fixed in space for a period of time. Advantages may be possible for systems in which the base stations are not fixed geographically.

SUMMARY

Described herein are electronic communication systems and methods in which at least part of the infrastructure, typically at least some of the base stations are not fixed geographically but rather may move while the system continues to provide service to consumer client mobile and portable units. The movable infrastructure may move through any physical medium—it may fly, move on land, or move through water. The system may be configured so that the movable infrastructure adapts to changing geographic conditions in order to provide continuous or improved coverage and service.

One embodiment is an electronic transmission system with movable infrastructure that is operative to adapt to changing geographical regions. In one particular form of such embodiment, the system includes at least one mobile transport platform operative to move between different geographical regions, and a first transmitter located onboard of each one of the mobile transport platforms that is operative to (i) dynamically select sets of communication parameters according to the location of the first transmitter relative to the changing geographical regions, wherein each of the set of parameters is associated with one of said geographical regions, and (ii) after concluding that transmission would not adversely affect at least a second of the geographical regions, transmit wirelessly to at least one receiver located in a specific first geographical region using a specific set of communication parameters associated with said specific first geographical region.

One embodiment is a method for adapting an airborne base-station in-motion. In one particular form of such embodiment, a first airborne base-station located in a first aerial position services wirelessly, via a first antenna configuration having a first transmission radiation pattern, a first group of wireless client devices located in a first geographical region, using a first set of communication parameters associated with said first geographical region. Also in this particular embodiment, the first base station moves from the first aerial position to a second aerial position. Also in this particular embodiment, the first base station adapts, from the first set of communication parameters, to a second set of communication parameters associated with a second geographical region, but only after the system takes into consideration an effect of the first transmission radiation pattern on the first and second geographical regions. Also in this particular embodiment, the first airborne base-station services wirelessly a second group of wireless client devices located in the second geographical location, using the second set of communication parameters.

One embodiment is a method for adapting a base-station in-motion to a new geographical region. In one particular form of such embodiment, a first base-station located in a first geographical region services wirelessly a first group of wireless client devices, using a first set of communication parameters associated with the first geographical region. Also in this particular embodiment, the first base-station moves from the first geographical region to a second geographical region. Also in this particular embodiment, the first base-station adapts from the first set of communication parameters to a second set of communication parameters associated with the second geographical region. Also in this particular embodiment, the first base-station located in the second geographical region services wirelessly a second group of wireless client devices, using said second set of communication parameters, only after the system concludes that servicing the second group of wireless client devices will not adversely affect communication in the first geographical region.

One embodiment is a method for adapting a backhaul communication connection of a base-station in-motion to a new geographical region. In one particular form of such embodiment, a first base-station located in a first geographical region establishes a first backhaul link with a first core network, via a first wireless communication link connecting the first base-station with a first relay station located in the first geographical region, using a first set of communication parameters for the first wireless communication link, wherein the first set of communication parameters are associated with the first geographical region. Also in this particular embodiment, the first base-station moves from the first geographical region to a second geographical region. Also in this particular embodiment, the first base-station adapts from the set of communication parameters to a second set of communication parameters associated with the second geographical region. Also in this embodiment, the first base-station establishes a second backhaul link with a second core network, via a second wireless communication link connecting the first base-station with a second relay station located in the second geographical region, using said second set of communication parameters for the second wireless communication link.

BRIEF DESCRIPTION OF THE DRAWINGS

The embodiments are herein described, by way of example only, with reference to the accompanying drawings. No attempt is made to show structural details of the embodiments in more detail than is necessary for a fundamental understanding of the embodiments. In the drawings:

FIG. 12D illustrates one embodiment of an electronic communication system in which there is a base-station in-motion that services one or more geographical regions, and in which the problem of multiple-region-coverage depicted in FIG. 12C has been resolved by redirecting the radiation pattern of the base-station in-motion to cover only a single geographical region;

FIG. 12E illustrates one embodiment of a base-station in-motion in which the direction of the radiation generated by the base-station has been changed in order to avoid or solve the problem of multiple-region-coverage;

DETAILED DESCRIPTION

Various embodiments are presented for combining features of a Radio Access Network (RAN) and those of a backhaul link or Network. In particular, and unlike the prior art, certain hardware and software resources are shared by the two Networks as needed. Such resources may include, for example, radio transceiver chains, interconnects, interconnect matrices, and RF power combiners. These resources will be dedicated on a time and need basis to either Network. This sharing permits the economizing of resources. In addition, the aggregated transmission power of the radio transceiver chains previously used for RAN communication can now be utilized for backhaul transmission, or the aggregated reception capability for multiple chains used for RAN communication can now be used to improve reception when receiving transmissions from the Core Network.

Figure 1A:
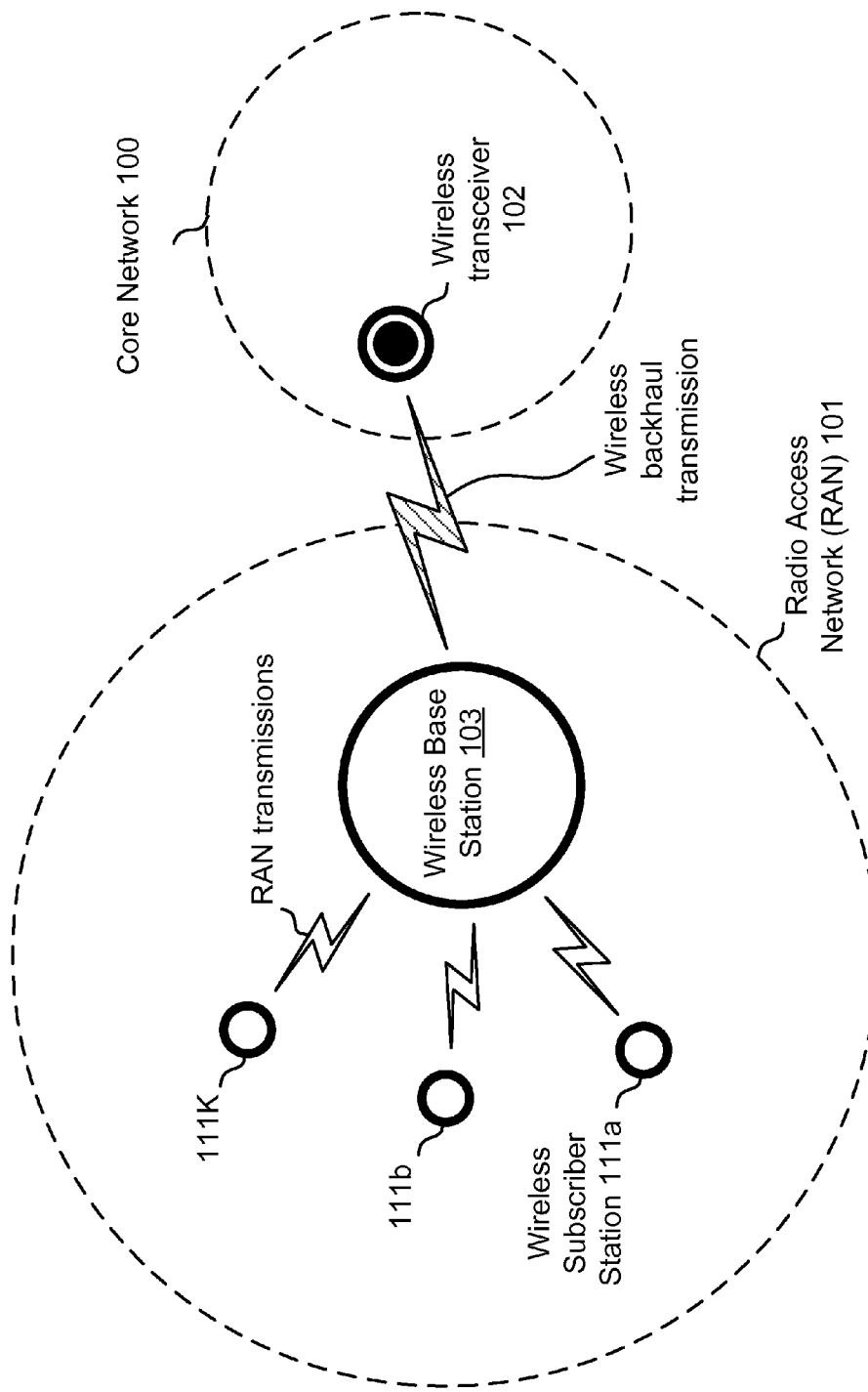
FIG. 1A illustrates one embodiment of components comprising a system.

FIG. 1A shows one embodiment of components comprising a system. In FIG. 1A, there is a wireless backhaul transmission between the wireless transceiver 102 of a Core Network 100, and the wireless BS 103 of a RAN 101. Non-limiting examples of the transmission path between the Core Network 100 and the wireless BS 103 include a point-to-point wireless connection, a point to multipoint wireless connection, a satellite connection, or other wireless connection. Elements 111a, 111b, and 111K, represent various SS units 111a-111K in communication with the wireless BS 103 of the RAN 101. Non-limiting examples of the SS units 111a-111K include wireless telephones, smartphones, wireless PDAs, and wireless modems.

Figure 1B:
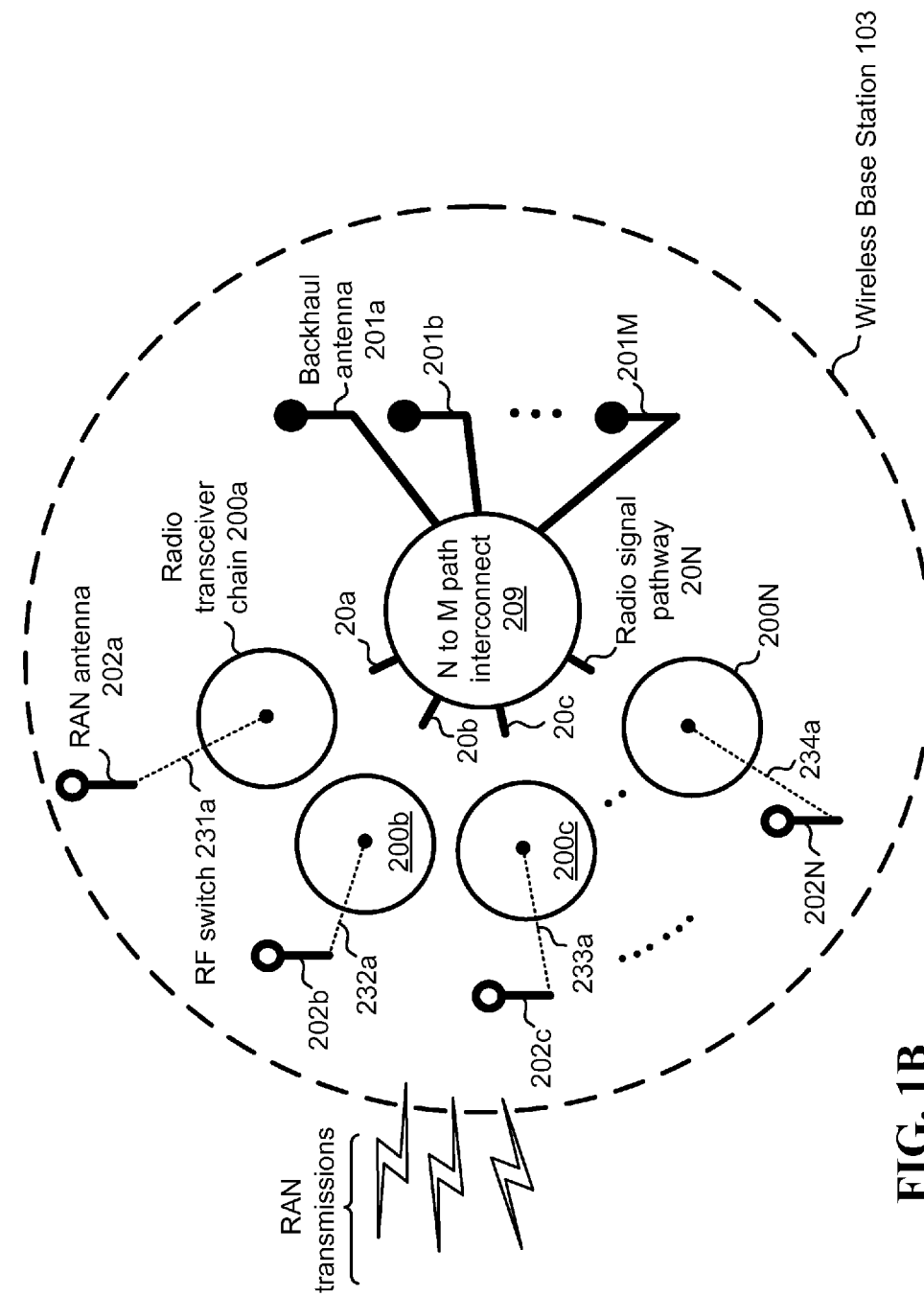
FIG. 1B illustrates one embodiment of components comprising a system, in which RAN antennas are connected to radio transceiver chains.

FIG. 1B shows one possible configuration at a particular point in time. In this configuration, there is a connection between the radio transceiver chains 200a, 200b, 200c, . . . 200N, and the corresponding RAN antennas 202a, 202b, 202c, . . . 202N. These connections are made by the corresponding RF switches 231a, 232a, 233a, and 234a. At the point of time conveyed by FIG. 1B, there is not a connection between radio transceiver chains and the other components of this embodiment.

Figure 1C:
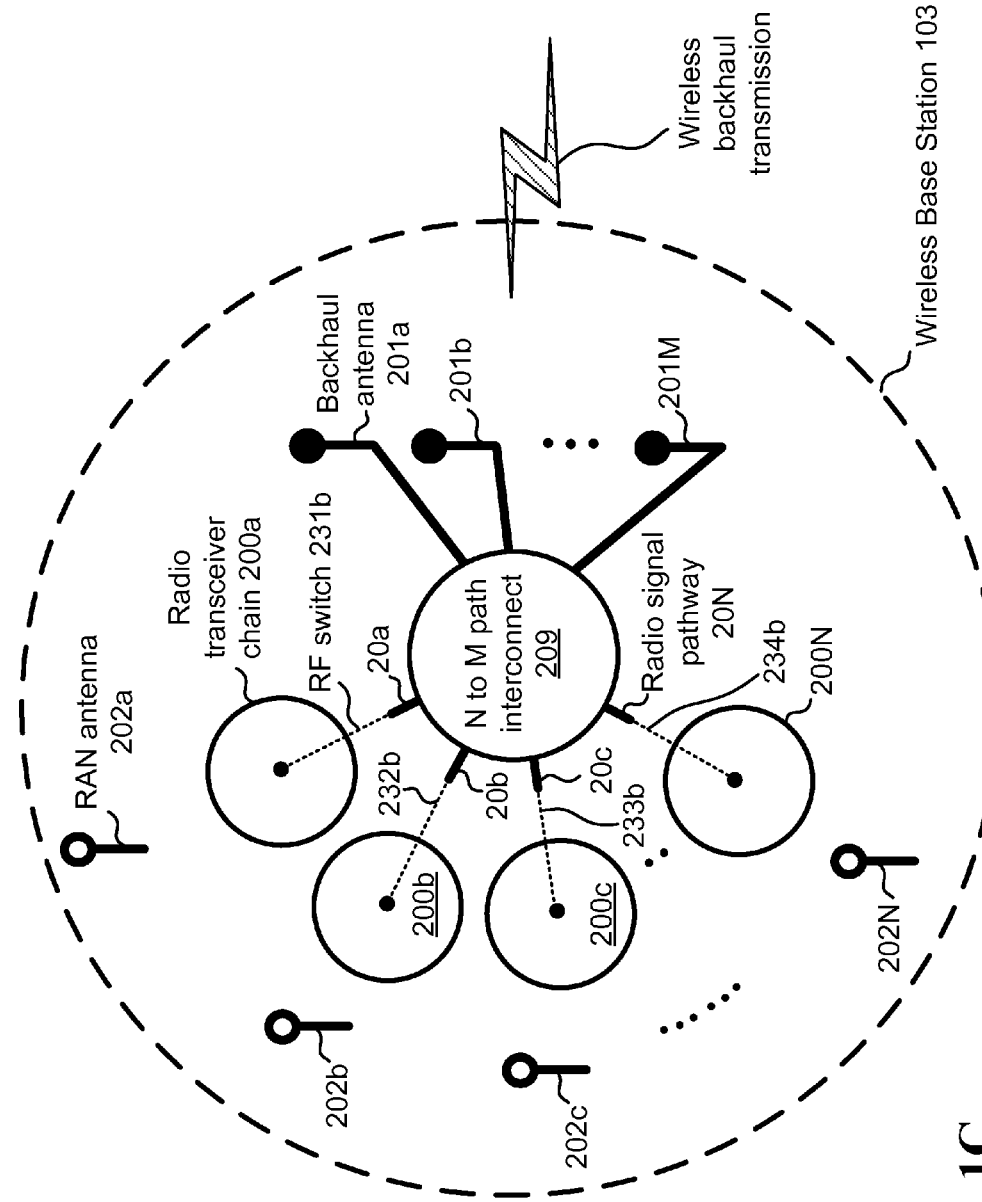
FIG. 1C illustrates one embodiment of components comprising a system in which radio transceiver chains are connected to an interconnect.

FIG. 1C, in contrast to FIG. 1B, shows a point of time at which there is no connection between the RAN antennas 202a-202N and the radio transceiver chains 200a-200N, but there is connection between the radio transceiver chains 200a-200N and the other components of the embodiment. In particular, the RF switches 231a-234a have now been turned off from the RAN antennas 202a-202N, and instead turned on to interconnect 209. The connection via the RF switches, connects the radio transceiver chains, via radio pathway signals 20a, 20b, 20c, . . . 20N, to interconnect 209.

The RF switches 231a-234a in a mode that connects the radio transceiver chains 200a-200N to the interconnect 209 are depicted as 231b, 232b, 233b, and 234b, whereas the series 231a, 232a, 233a, and 234a, appeared in FIG. 1B rather than here, and showed connection to RAN antennas which is not shown here. FIG. 1C also shows connection of interconnect 209 to the Backhaul antennas 201a, 201b, . . . 201M.

Taken together, FIG. 1B and FIG. 1C show initial RAN transmissions and initial connection to the RAN antennas 202a-202N, followed by connection of the N radio transceiver chains among 200a-200N to interconnect 209, followed by or simultaneously with connection between interconnect 209 and M Backhaul antennas 201a-201M. Element 209 is termed "N to M path interconnect", because it is able to connect all of the N radio transceiver chains, with all of the M Backhaul antennas. Hence, there are N to M path interconnections.

Structural elements presented in FIGS. 1A, 1B, and 1C, allow implementation of various methods for wirelessly relaying data between a Core Network 100 and a Radio Access Network (RAN) 101, utilizing an aggregated Radio Frequency (RF) power of a plurality of radio transceiver chains. In one embodiment, a RAN 101 operates, in which the RAN 101 includes a wireless BS 103, which itself includes N radio transceiver chains 200a-200N and N corresponding RAN antennas 202a-202N, all as shown in FIG. 1B and FIG. 1C. In this embodiment, N may be two, or more than two, but N may not be one or zero. In this embodiment, data is communicated wirelessly between at least one wireless SS among 111a-111K and the wireless BS 103. After the connection has been made by the RF switches 231a-234a between the N RAN antennas 202a-202N, the N radio transceiver chains 200a-200N and the wireless BS 103, and after wireless communication has occurred along this path from RAN 101 to the wireless BS 103, the wireless BS 103 disconnects the N radio transceiver chains 200a-200N from the corresponding N RAN antennas 202a-202N. After this disconnection, the wireless BS 103 then creates a new connection between the N radio transceiver chains 202a-202N, via the N radio signal pathways 20a-20N, to the M Backhaul antennas 201a-201M. Via this new connection, at least some of the data received via the N RAN antennas 202a-202N is communicated wirelessly from the wireless BS 103 and a wireless transceiver 102 of the Core Network 100.

In the wireless communication between the wireless BS 103 and the transceiver 102 of the Core Network 100, at least some of the RF power from two or more of the N radio transceiver chains 200a-200N is aggregated in order to increase the RF power of the communication between the wireless BS 103 and the transceiver 102 of the Core Network 100. Optionally, all or substantially all, of the RF power from all of the N radio transceiver chains 200a-200N is aggregated and used in this manner. It is possible that the RF power from two or more, but not all, of the N radio transceiver chains 200a-200N is aggregated and used in this manner. In all cases, whatever the combination, there is an additive effect of combining RF power from two or more radio transceiver chains 200a-200N.

This additive power may be used in any number of ways, well known in the art. For example, it may be used to increase the transmission power of transmissions from the wireless BS 103 to the wireless transceiver 102 of the Core Network 100. Or for example, it may be used to increase the reception sensitivity of transmission received by the wireless BS 103 from the wireless transceiver 102 of the Core Network 100.

In one embodiment, data is wirelessly relayed between a Core Network 100 and a RAN 101, utilizing an aggregated Radio Frequency (RF) power of a plurality of radio transceiver chains 200a-200N. A RAN 101 including a wireless BS 103, operates, in which the wireless BS 103 includes N radio transceiver chains 20a-200N and at least two corresponding RAN antennas 202a-202N. Data is communicated wirelessly between at least one wireless Subscriber Station (SS) 111a-111K and the wireless BS 103, via the N radio transceiver chains 200a-200N and the corresponding N RAN antennas 202a-202N. The wireless BS 103 disconnects the N radio transceiver chains 200a-200N from the N RAN antennas 202a-202N. The wireless BS 103 connects the N radio transceiver chains 200a-200N to N radio signal pathways 20a-20N leading to M Backhaul antennas 201a-201M belonging to the wireless BS 103. At least some of the data is wireless communicated, via the N radio transceiver chains 200a-200N and the M Backhaul antennas 201a-201M, between the wireless BS 103 and a wireless transceiver 102 of the Core Network 100, utilizing the aggregated RF power of the N radio transceiver chains 200a-200N.

In one embodiment, the M Backhaul antennas 201a-201M are better situated, as compared to the N RAN antennas 202a-202N, to facilitate communication with a wireless transceiver 102 belonging to the Core Network 100. The concept of a "better situated" antenna is illustrated in FIGS. 5 and 6.

Figure 5:
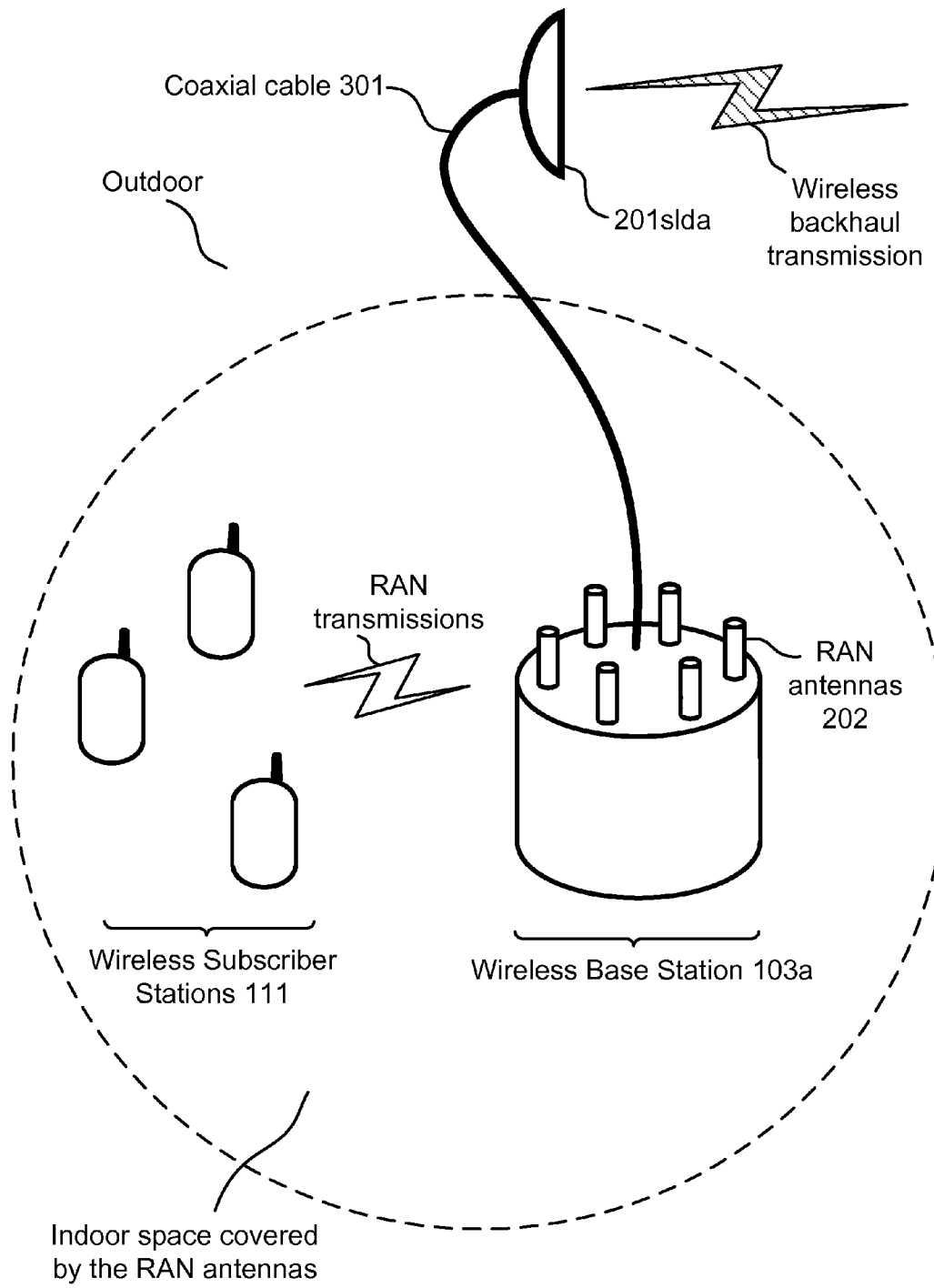
FIG. 5 illustrates one embodiment of components comprising a system in which the elements of a RAN are encompassed within an indoor space, while a Backhaul antenna of a Core Network is not within said indoor space.

FIG. 5 illustrates one embodiment of a wireless base station 103a with the particular form shown in FIG. 5. Wireless subscriber stations are shown as 111. RAN antennas are shown as 202, and these have RAN transmissions with the wireless subscriber stations 111. A coaxial cable 301 runs to a directional antenna 201slda, which communicates with a wireless backhaul transmission. In FIG. 5, all of the elements, except for part of cable 301 and antenna 201*alda*, are located in an indoor space, whereas part of 301 and all of 201 are outside. In this non-limiting example, the placement of antenna 201*slda* facilitates communication with wireless transceiver 102 belonging to the Core Network 100, so that 201*slda* can be said to be better situated for such communication than the RAN antennas 202*a*-202N.

Figure 6:
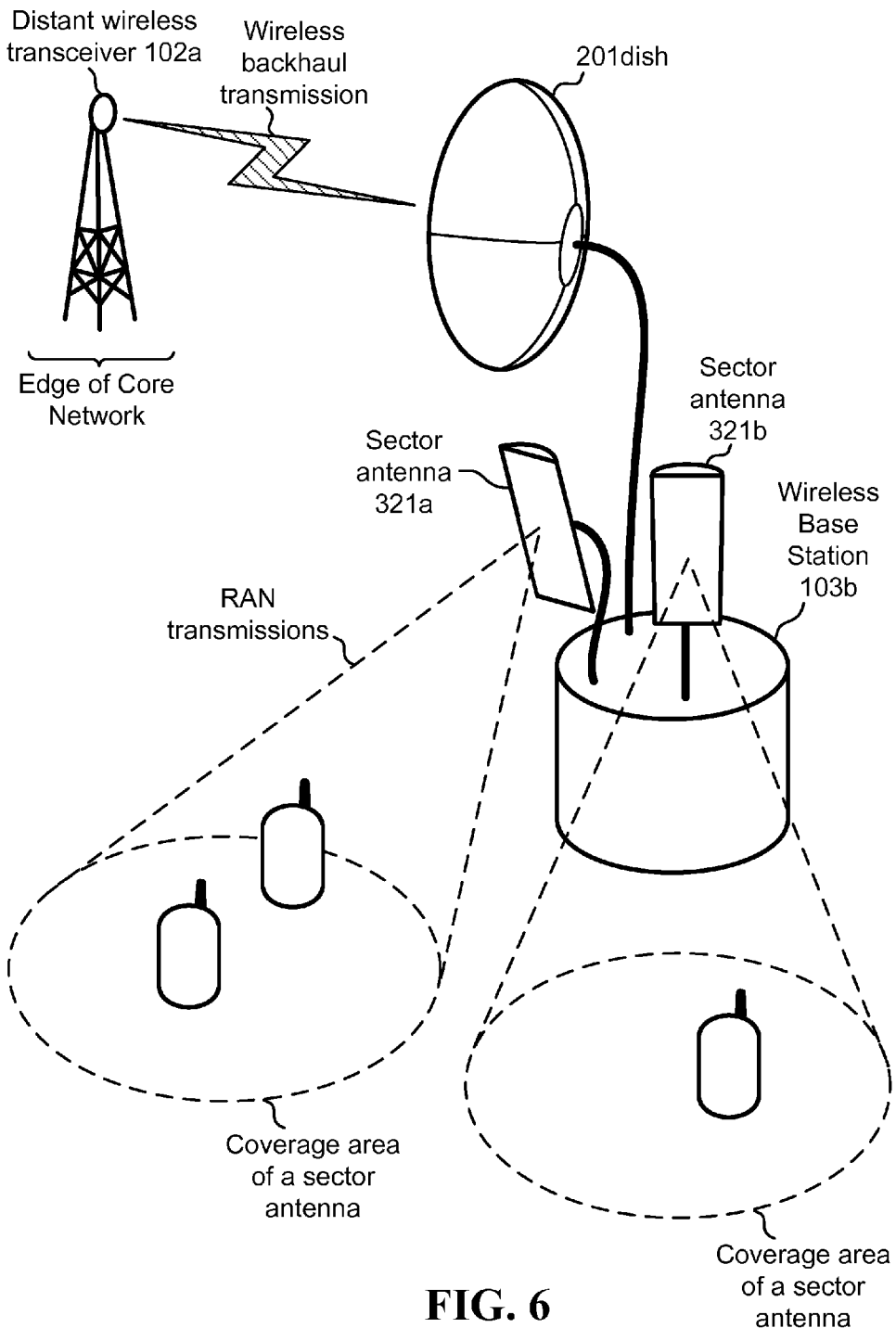
FIG. 6 illustrates one embodiment of components comprising a system in which the RAN includes sector antennas, while the Backhaul antenna is situated in a different place than the place of the RAN sector antennas and in which the Backhaul antenna is pointed in a different direction than the coverage areas of the RAN sector antennas.

FIG. 6 illustrates one embodiment of a wireless base station 103*b*, which includes at least one or more sectoral antennas, here shown on sector antenna 321*a* and sector antenna 321*b*, in which sectoral antenna communicates with a particular coverage area. In FIG. 6, the sectors are illustrated as non-overlapping, but it is understood that the sectors may overlap in whole or in part, according to the system requirements and needs. In FIG. 6, there is an antenna 201*dish*, which communicates via wireless backhaul transmissions to a distant wireless transceiver 102*a*. FIG. 6 illustrates that 201*dish* is physically higher than sector antennas 321*a* and 321*b*. This greater height facilitates communication with wireless transceiver 102 belonging to the Core Network 100, so that 201*dish* can be said to be better situated for such communication than the sector antennas 321*a* and 321*b*. In addition, the sector antennas 321*a* and 321*b* are pointed in direction that enhances coverage of the sector, whereas 201*dish* is pointed in a direction that facilities communication with wireless transceiver 102 belonging to Core Network 100, so that 201*dish* can be said to be better situated for such communication than the sector antennas 321*a* and 321*b*.

Any one or more of indoor/outdoor, height, or position, can allow a backhaul antenna to be better situated than sector antennas for communication with a Core Network.

In one embodiment, M (the number of backhaul antennas 201*a*-201N) equals N (the number of radio transceiver chains 200*a*-200N), each of the N radio transceiver chains 200*a*-200N connects to a corresponding one of the M Backhaul antennas 201*a*-201M via a corresponding one of the N radio signal pathways 20*a*-20N, and the M Backhaul antennas 201*a*-201M form a phased array antenna substantially directed toward the wireless transceiver 102 belonging to the Core Network 100.

Figure 2A:
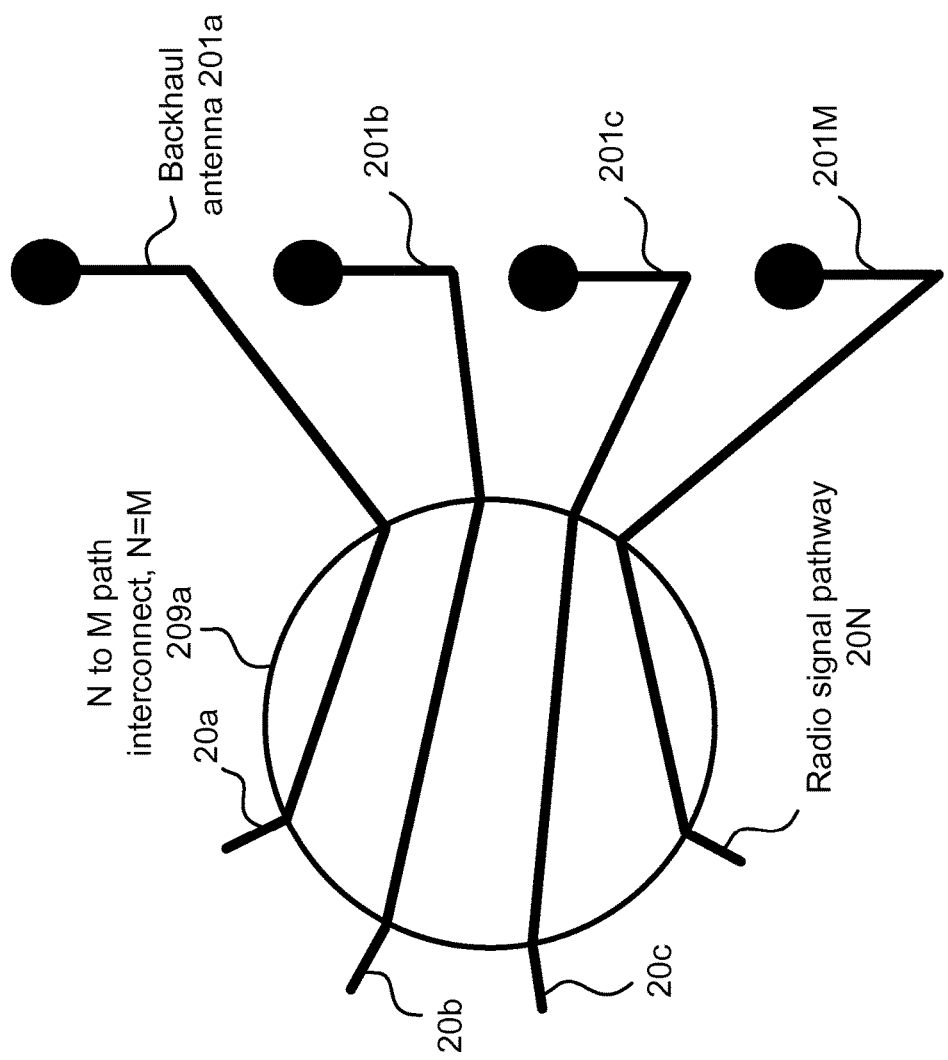
FIG. 2A illustrates one embodiment of components comprising a system in which N radio signal pathways connected to N Backhaul antennas.

FIG. 2A illustrates one embodiment of a N to M path interconnect 209*a*, in which there is each of the N radio transceiver chains 200*a*-20N connects, via radio signal pathways 20*a*-20N, to a corresponding backhaul antenna, shown as 201*a*, 201*b*, 201*c*, and 201M. FIG. 2A also illustrates that the backhaul antennas 201*a*-201M, for a phased array antenna. The phased array antenna is substantially directed toward the wireless transceiver 102 belonging to the Core Network 100, although elements 100 and 102 are not included in FIG. 2A.

Figure 3:
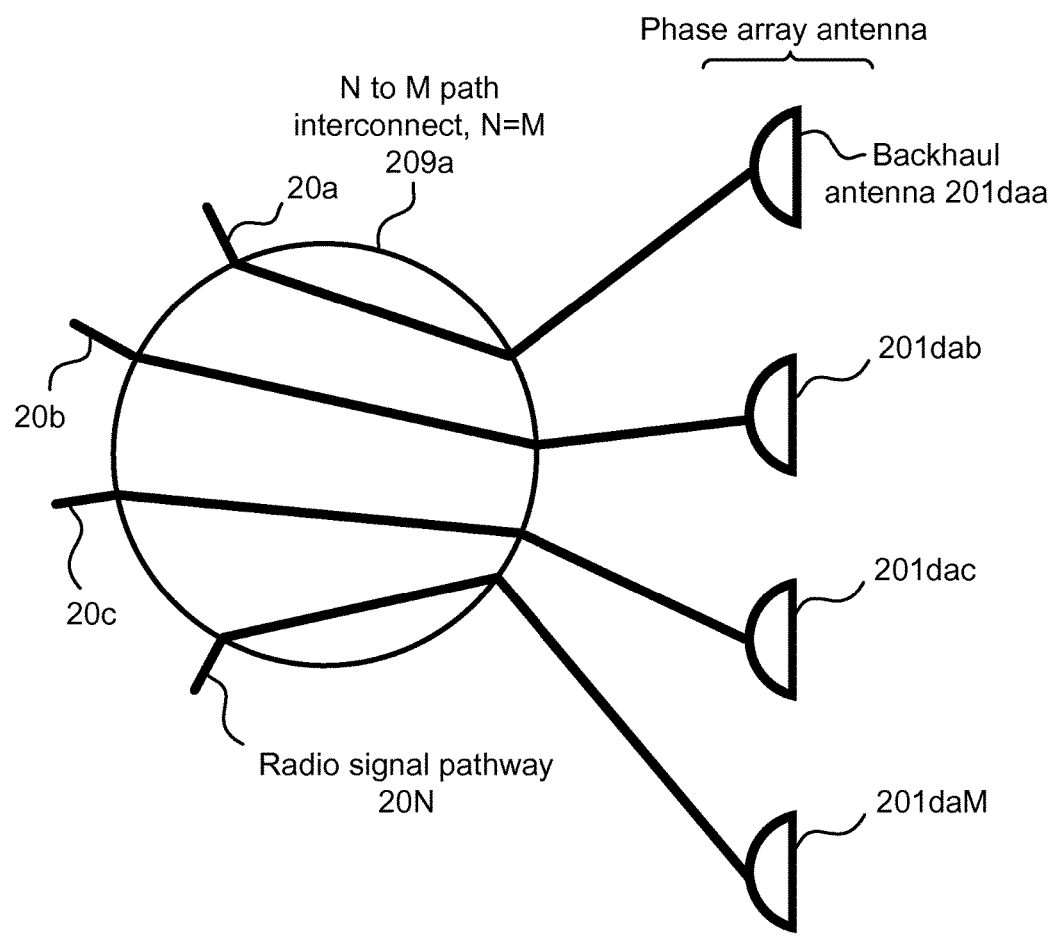
FIG. 3 illustrates one embodiment of components comprising a system in which N radio signal pathways are connected to N Backhaul antennas, and in which the N Backhaul antenna form a phased array antenna.

FIG. 3 illustrates one embodiment of an N to M path interconnect 209*a*, in which M Backhaul antennas 201*a*-201M for a phased array antenna substantially directed toward the wireless transceiver 102 belong to the Core Network 100, and each of the Backhaul antennas is a dish antenna, as depicted 201*daa*, 201*dab*, 201*dac*, and 201*daM*. It is also possible, though not shown in FIG. 2A or in FIG. 3, that some of the backhaul antennas will be dish antennas while some of the backhaul antennas will be omni-directional or other non-dish antennas.

In one embodiment, the combined RF output power of the N radio transceiver chains 200*a*-200N is substantially fully transferred to the phased array antenna.

In one embodiment, the combined RF input power of the N radio transceiver chains 200*a*-200N is utilized to increase reception sensitivity of the wireless BS 103 in respect to signals arriving from the wireless transceiver of the Core Network 102 via the phased array antenna.

In one embodiment, the RF phases of the N radio transceiver chains 200*a*-200N are adjusted to correspond with a phase configuration forming a beam pattern directed toward the wireless transceiver 102 of the Core Network 100, prior to wirelessly communicating the at least some of the data between the wireless BS 103 and the wireless transceiver 102 of the Core Network 100.

In one embodiment, M equals N, and each of the N radio transceiver chains 200*a*-200N connects to a corresponding one of the M Backhaul antennas 201*a*-201M via a corresponding one of the N radio signal pathways 20*a*-20N, and the M Backhaul antennas 201*a*-201M form a Multiple-In-Multiple-Out (MIMO) antenna configuration together with antennas of the wireless transceiver 102 belonging to the Core Network 100.

In one embodiment, the combined RF output power of the N radio transceiver chains 200*a*-200N is substantially fully transferred to the MIMO antenna configuration.

In one embodiment, the combined RF input power of the N radio transceiver chains 200*a*-200N is utilized to increase reception sensitivity of the wireless BS 103 in respect to signals arriving from the wireless transceiver 102 of the Core Network 100 via the MIMO antenna configuration.

In one embodiment, at least some of the data is re-coded to M streams of data facilitating the MIMO antenna configuration, and fed to the N radio transceiver chains 200*a*-200N connected to the M Backhaul antennas 201*a*-201M with the M streams of data respectively.

Figure 2B:
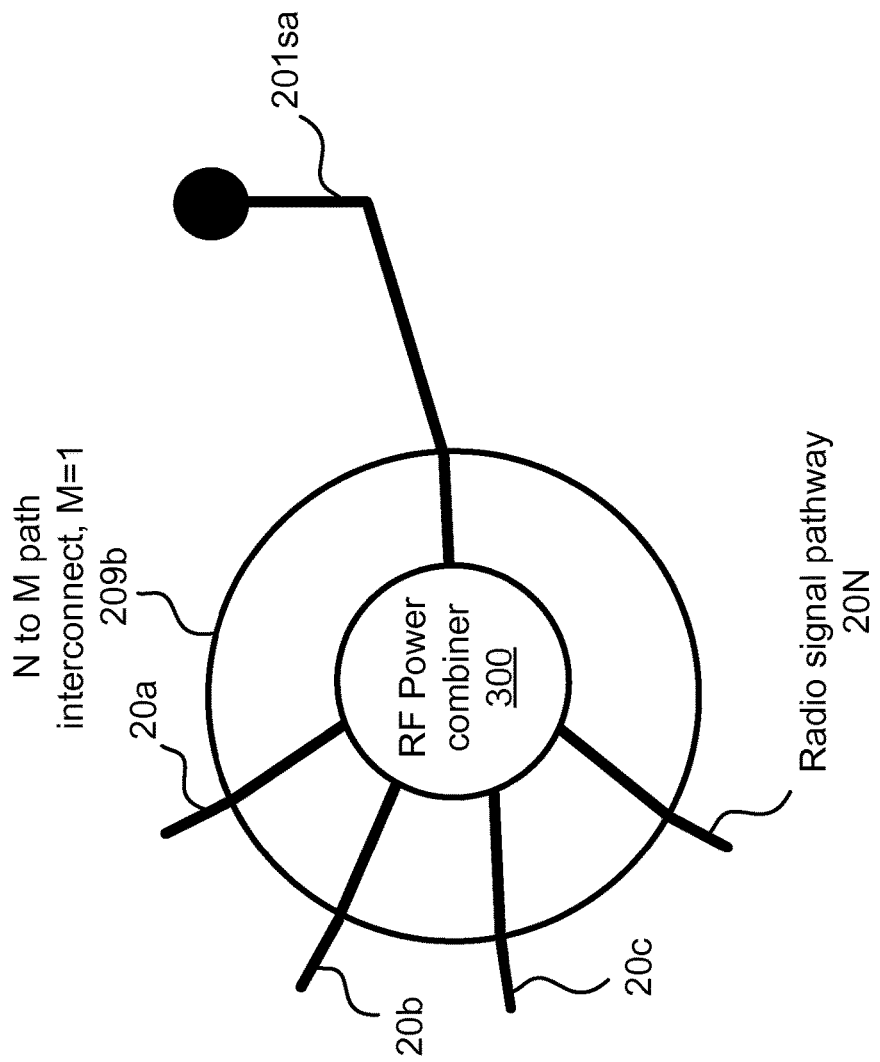
FIG. 2B illustrates one embodiment of components comprising a system in which N radio signal pathways are combined by an RF power combiner into one Backhaul antenna.

In one embodiment, the M number of Backhaul antennas is one (that is, there is one backhaul antenna from the possible selection of 201*a*-201M), the N radio signal pathways 20*a*-20N are merged into one radio signal pathway connected to the one Backhaul antenna, and the one Backhaul antenna is substantially directed toward the wireless transceiver 102 belonging to the Core Network 100. FIG. 2B illustrates this embodiment, in which the radio signal pathways 20*a*-20N are merged by an RF Power combiner 300, located within or near the N to M path interconnect 209*b*, wherein the single merged radio signal pathway is directed to one backhaul antenna 201*sa*. Backhaul antenna 201*sa* is substantially directed toward the wireless transceiver 102 belonging to the Core Network 100, although elements 100 and 102 are not illustrated in FIG. 2B.

Figure 4:
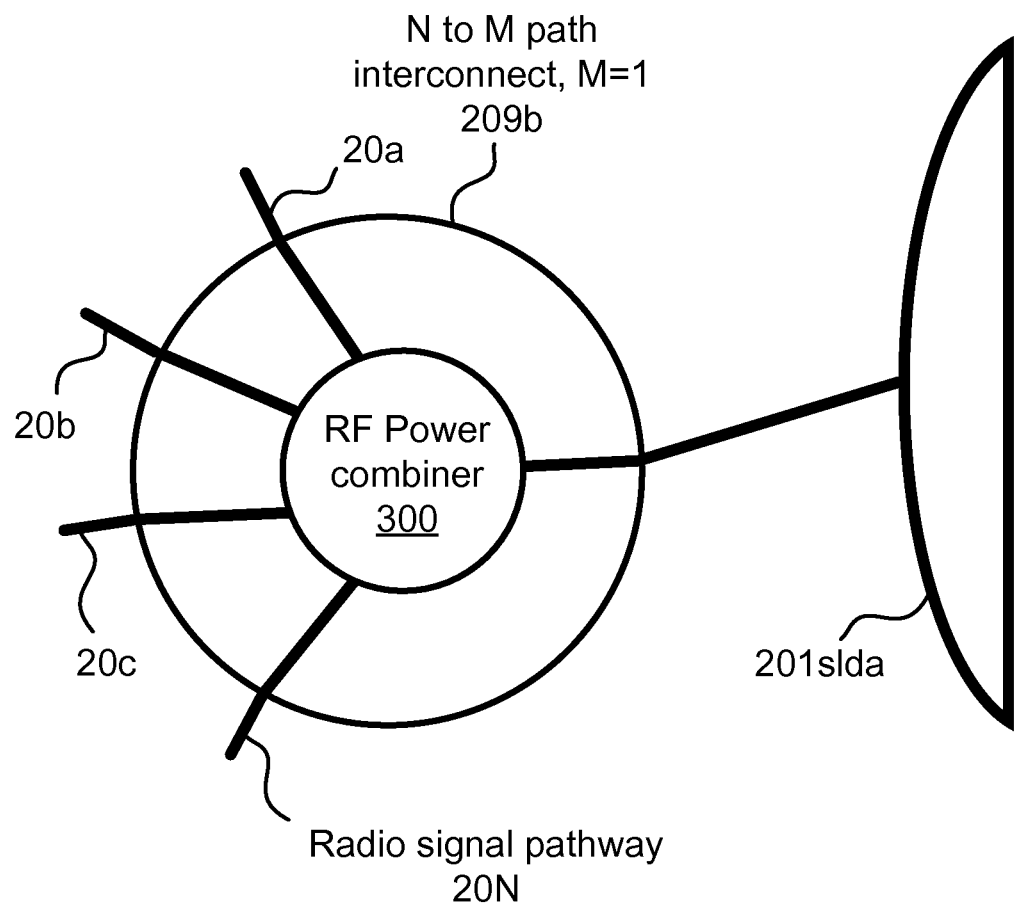
FIG. 4 illustrates one embodiment of components comprising a system in which N radio signal pathways are combined by an RF power combiner into one Backhaul antenna, and in which the Backhaul antenna includes a directional dish.

FIG. 2B illustrates one embodiment. Another embodiment is illustrated in FIG. 4, in which the single backhaul antenna is a dish, depicted as 201*slda*.

In one embodiment, in which N=M, and an RF power combiner 300 merges radio signal pathways 20*a*-20N into one radio signal pathway connected to a backhaul antenna, the combined RF output power of the N radio transceiver chains 200*a*-200N is substantially fully transferred to the one backhaul antenna. In this case, the backhaul antenna may be 201*sa* or 201*slda* or any other configuration for communication with the radio transceiver 102 of the Core Network 100.

In one embodiment, in which N=M, and an RF power combiner 300 merges radio signal pathways 20*a*-20N into one radio signal pathway connected to a backhaul antenna, the RF phases of the N radio transceiver chains are combined substantially coherently into the one radio signal pathway, thereby maximizing RF transmission power via the one backhaul antenna.

In one embodiment, the N RAN antennas 202*a*-202N are situated such that at least some of them are directed towards a location where wireless Subscriber Stations 111*a*-111K are present, and the location where wireless Subscriber Stations 111a-111K are present is substantially different than a location where the wireless transceiver 102 belonging to the Core Network 100 is present.

In one embodiment, the N RAN antennas 202a-202N comprise at least two groups of antennas, and each group of antennas forms a sector antenna facilitating communication with some wireless Subscriber Stations 111a-111K located within the coverage area of that sector antenna. 321a and 321b in FIG. 6, show sector antennas, but each sector antenna is shown as one antenna, whereas it is possible, as stated herein, that each sector antenna is made up of a group of antennas.

In one embodiment, the transmission power of each sector antenna (whether the sector antenna is made up of a single antenna or a group of antennas) is lower than a combined transmission power of M backhaul antennas 201a-201M. This may result when the transmission power of a sector antenna is fed by less than N radio transceiver chains 200a-200N, and the M backhaul antennas 201a-201M are fed by the N radio transceiver chains 200a-200N.

In one embodiment, the N RAN antennas 202a-202N are omni-directional and therefore substantially support wide-angle coverage, the M Backhaul antenna(s) 201a-201M is/are directional, and the M Backhaul antenna(s) 201a-201M are directed toward the wireless transceiver 102 belonging to the Core Network 100.

In one embodiment, the N RAN antennas 202a-201N are substantially incapable of supporting communication between the wireless BS 103 and the Core Network 100.

In one embodiment, the wireless BS 103, transiently stores at least some of the data received from the at least one wireless SS 111a-111K, before wirelessly communicating the at least some of the data between the wireless BS 103 and the wireless transceiver 102 of the Core Network 100.

In one embodiment, wirelessly communicated data between at least one wireless SS 111a-111K and the wireless BS 103, via the N radio transceiver chains 200a-200N and the corresponding N RAN antennas 202a-202N, is done using a first radio frequency range, and wirelessly communicating at least some of the data, via the N radio transceiver chains 200a-200N and the M Backhaul antennas 201a-201M, between the wireless BS 103 and the wireless transceiver 102 of the Core Network 100, is also done using the first radio frequency range, wherein using the same radio frequency range for both RAN communication and the Backhaul communication is considered an "In-Band Backhaul communication".

In one embodiment, the M Backhaul antennas 201a-201M are substantially better situated, as compared to the N RAN antennas 202a-202N, to facilitate communication with a wireless transceiver 102 belonging to the Core Network 100.

In one embodiment, there is system for wirelessly relaying data between a Core Network 100 and a Radio Access Network (RAN) 101, the system including (1) N radio transceiver chains 200a-200N, wherein N is equal to at least two, (2) N RAN antennas 202a-202N forming radiation patterns covering a first location of at least one wireless Subscriber Stations (SS) 111a-111K, (3) N Backhaul antennas 201a-201M forming a radiation pattern covering a second location of a wireless transceiver 102 belonging to the Core Network 100, and N RF switches 231a-234a, wherein the system communicates data wirelessly with at least one wireless SS 111a-111K, via the N radio transceiver chains 200a-200N and the corresponding N RAN antennas 202a-202N, then switches the N radio transceiver chains 200a-200N from the N RAN antennas 202a-202N to the N Backhaul antennas 201a-201M using the N RF switches 231a-234a, and communicates wirelessly at least some of the data, via the N radio transceiver chains 200a-200N and the N Backhaul antennas 201a-201M, with the wireless transceiver 102 of the Core Network 100, utilizing the aggregated RF power of the N radio transceiver chains 200a-200N.

In one embodiment, there is a system previously described for wirelessly relaying data between a Core Network 100 and a Radio Access Network (RAN) 101, wherein the N Backhaul antennas 201a-201M form a phased array antenna substantially directed toward the wireless transceiver 102 belonging to the Core Network 100.

In one embodiment, there is system for wirelessly relaying data between a Core Network 100 and a Radio Access Network (RAN) 101, in which there is a phased array antenna as previously described, and wherein the combined RF output power of the N radio transceiver chains 200a-200N is substantially fully transferred to the phased array antenna.

In one embodiment, there is system for wirelessly relaying data between a Core Network 100 and a Radio Access Network (RAN) 101, in which there is a phased array antenna as previously described, wherein the combined RF input power of the N radio transceiver chains 200a-200N is utilized to increase reception sensitivity of the wireless BS 103 in respect to signals arriving from the wireless transceiver 102 of the Core Network 100 via the phased array antenna.

In one embodiment, there is a system for wirelessly relaying data between a Core Network 100 and a Radio Access Network (RAN) 101, in which there is a phased array antenna as previously described, the system adjusts the RF phases of the N radio transceiver chains 200a-200N to correspond with a phased configuration forming a beam pattern directed toward the wireless transceiver 102 of the Core Network 100, prior to wirelessly communicating the at least some of the data between the wireless BS 103 and the wireless transceiver 102 of the Core Network 100.

In one embodiment, there is a system for wirelessly relaying data between a Core Network 100 and a Radio Access Network (RAN) 101, wherein the N Backhaul antennas 201a-201M form a Multiple-In-Multiple-Out (MIMO) antenna configuration together with antennas of the wireless transceiver 102 belonging to the Core Network 100.

In one embodiment, there is a system for wirelessly relaying data between a Core Network 100 and a Radio Access Network (RAN) 101, including a MIMO antenna configuration as previously described, wherein the combined RF output power of the N radio transceiver chains 200a-200N is substantially fully transferred to the MIMO antenna configuration.

In one embodiment, there is a system for wirelessly relaying data between a Core Network 100 and a Radio Access Network (RAN) 101, including a MIMO antenna configuration as previously described, wherein the combined RF input power of the N radio transceiver chains 200a-200N is utilized to increase reception sensitivity of the wireless BS 103 in respect to signals arriving from the wireless transceiver 102 of the Core Network 100 via the MIMO antenna configuration.

In one embodiment, there is a system for wirelessly relaying data between a Core Network 100 and a Radio Access Network (RAN) 101, including a MIMO antenna configuration as previously described, in which the system re-codes, by a processor, the at least some of the data to N streams of data facilitating the MIMO antenna configuration; and feed the N radio transceiver chains 200a-200N connected to the N Backhaul antennas 201a-201M with the M streams of data respectively.

In one embodiment, there is a system for wirelessly relaying between a Core Network 100 and a Radio Access Network (RAN) 101, wherein wirelessly communicating data between at least one wireless SS 111a-111K and the wireless BS 103, via the N radio transceiver chains 200a-200N and the corresponding N RAN antennas 202a-202N, is done using a first radio frequency range, and wirelessly communicating at least some of the data, via the N radio transceiver chains 200a-200N and the N Backhaul antennas 201a-201M, between the wireless BS 103 and the wireless transceiver 102 of the Core Network 100, is also done using the first radio frequency range, wherein using the same radio frequency range for both RAN communication and Backhaul communication is considered an In-Band Backhaul communication.

In one embodiment, there is a system for wirelessly relaying data between a Core Network 100 and a Radio Access Network (RAN) 101, the system including (1) N radio transceiver chains 200a-200N, wherein N is equal to at least two, (2) N RAN antennas 202a-202N forming radiation patterns covering a first location of at least one wireless Subscriber Stations (SS) 111a-111K, (3) one Backhaul antenna (from the group 201a-201M) forming a radiation pattern covering a second location of a wireless transceiver 102 belonging to the Core Network 100, (4) N RF switches 231a-234a, and (5) RF power combiner 300, wherein the system communicates data wirelessly with at least one wireless SS 111a-111K, via the N radio transceiver chains 200a-200N and the corresponding N RAN antennas 202a-202N, then switches the N radio transceiver chains 200a-200N from the N RAN antennas 202a-202N to the one Backhaul antenna (from 201a-201M) using the N RF switches 231a-234a and RF power combiner 300, and communicates wirelessly at least some of the data, via the N radio transceiver chains 200a-200N and the one Backhaul antenna (from 201a-201M), with the wireless transceiver 102 of the Core Network 100, utilizing the aggregated RF power of the N radio transceiver chains 200a-200N.

In one embodiment, a system for wirelessly relaying data between a Core Network 100 and a Radio Access Network (RAN) 101 as previously described, wherein the combined RF output power of the N radio transceiver chains 200a-200N is substantially fully transferred to the one backhaul antenna (from 201a-201M) using the N RF switches 231a-234a and the RF power combiner 300.

In one embodiment, a system for wirelessly relaying data between a Core Network 100 and a Radio Access Network (RAN) 101, wherein the combined RF output power of the N radio transceiver chains 200a-200n is substantially fully transferred to the one backhaul antenna (from 201a-201M) as previously described, wherein the system adjusts the RF phases of the N radio transceiver chains 200a-200N to combine substantially coherently into the one backhaul antenna (from 201a-201M), thereby maximizing RF transmission power.

Figure 7A:
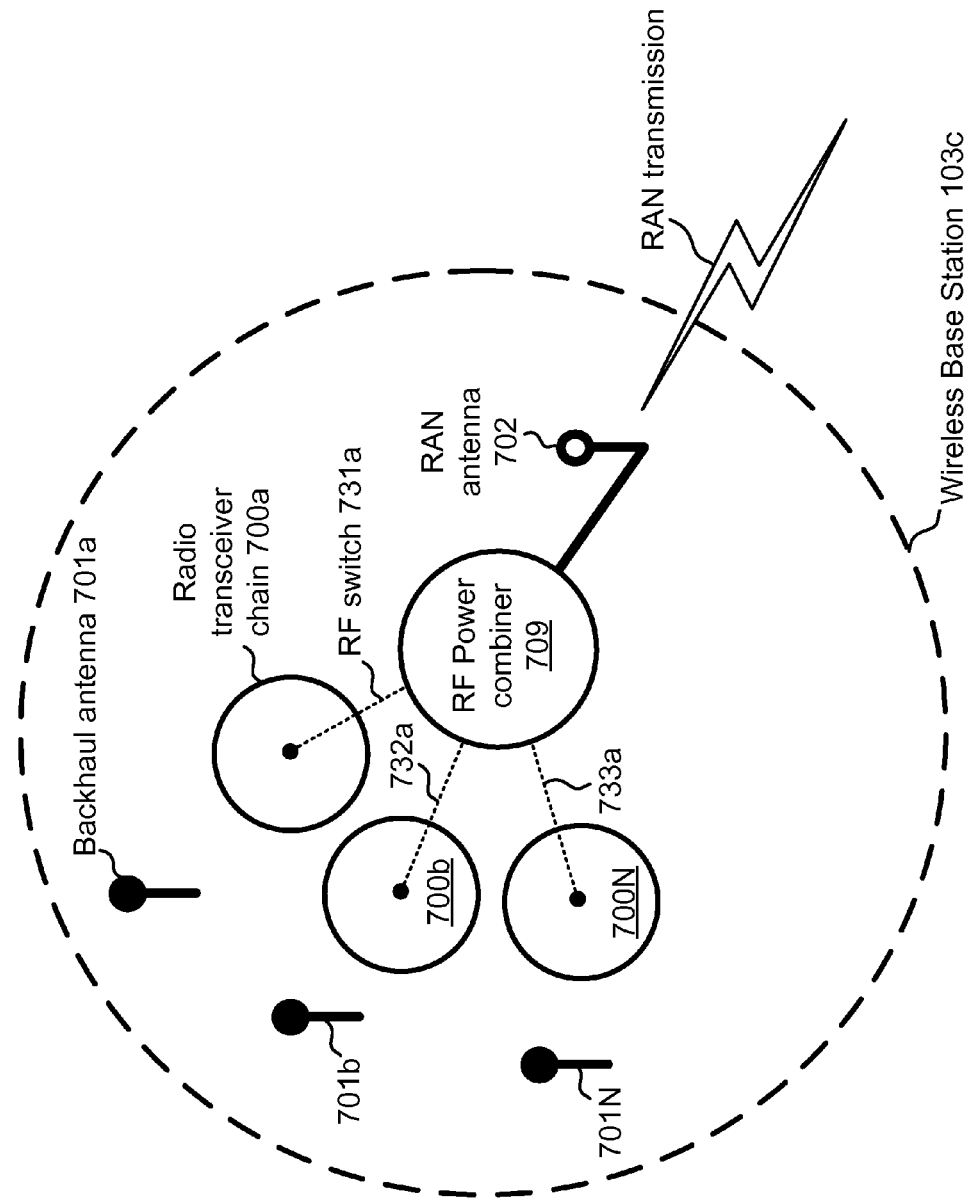
FIG. 7A illustrates one embodiment of components comprising a system in which N radio signal pathways are combined by an RF power combiner into one RAN antenna.

FIG. 7A illustrates the elements of a system for wirelessly relaying data between a Core Network (100, not shown in FIG. 7) and a Radio Access Network (RAN) (101, not shown in FIG. 7). The system includes (1) N backhaul antennas 700a-700N that communicate with the wireless transceiver 102 of the Core Network 100, (2) a RAN antenna 702, that communicates with wireless Subscriber Stations 111a-111K (not shown in FIG. 7), (3) an RF power combiner that mergers the RF power of the radio transceiver chains 700a-700N, and (4) N RF switches 731a-733a, that connect the N radio transceiver chains to the RF power combiner 709. In FIG. 7A, communication is enabled between the RAN antenna 702 and the wireless SS 111a-111K.

Figure 7B:
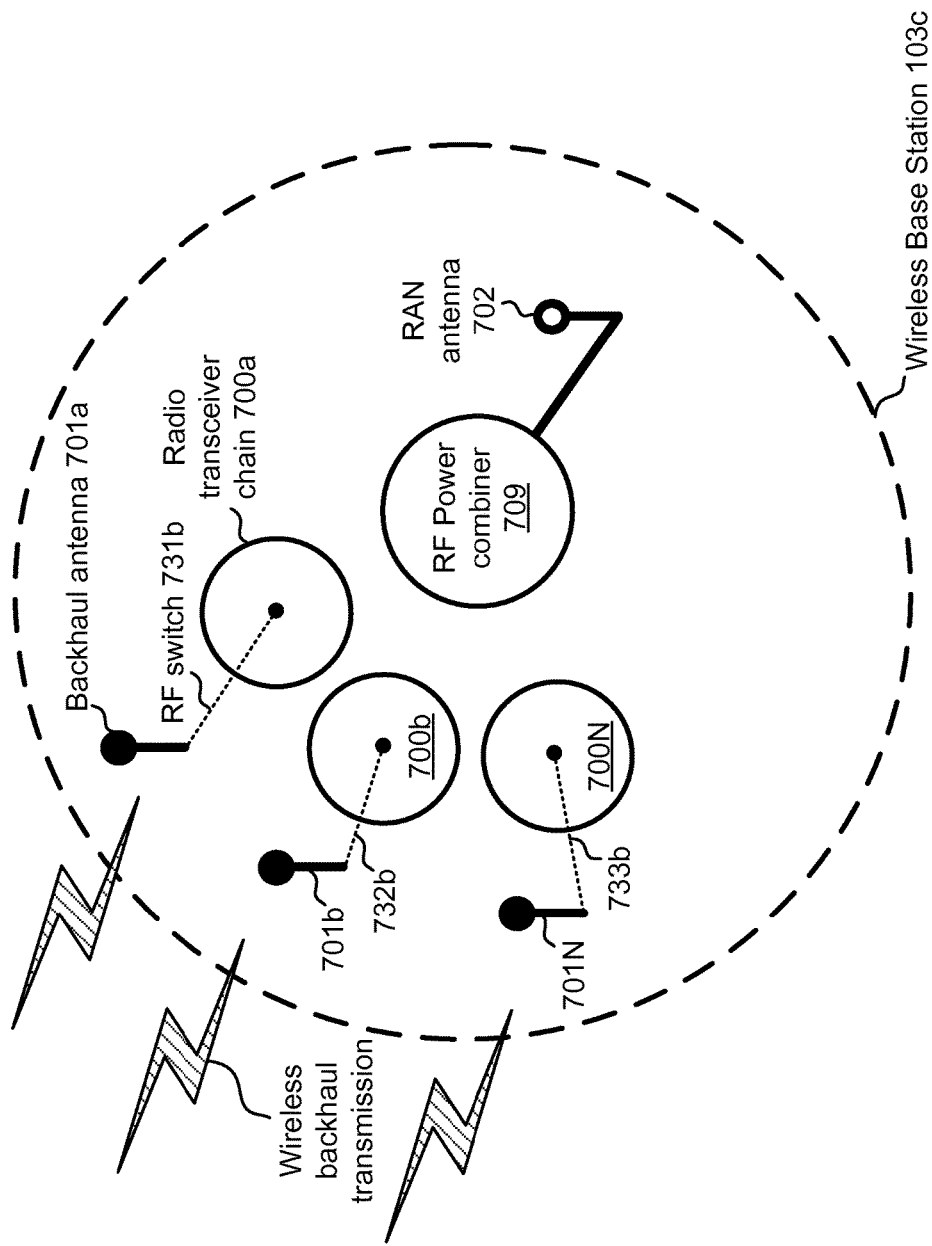
FIG. 7B illustrates one embodiment of components comprising a system in which N radio receiver chains are connected to N Backhaul antennas.

FIG. 7B illustrates the same structural elements as does FIG. 7A, but in a different position, at a different point of time. In FIG. 7B, the RF switches are not connecting the radio receiver chains 700a-700N to the RF power combiner 709 as in FIG. 7A, but rather connect the radio transceiver chains 700a-700N to the backhaul antennas 701a-701N. At the point of time, and in the position, illustrated in FIG. 7B, communication is enabled between the wireless transceiver 102 of the Core Network 100 and the backhaul antennas 701a-701N.

In one embodiment, data is wirelessly relayed between a Core Network 100 and a Radio Access Network (RAN) 101, utilizing an aggregated Radio Frequency (RF) power of a plurality of radio transceiver chains 700a-700N. A RAN 101 including a wireless BS 103c, operates, in which the wireless BS 103c includes N radio transceiver chains 700a, 700b, to 700N when N is equal to at least two, and a RAN antenna 702. The N radio transceiver chains 700a-700N are connected to the RAN antenna 702 via an RF power combiner 709. Data is communicated wirelessly between at least one wireless Subscriber Station (SS) 111a-111K and the wireless BS 103c, via the N radio transceiver chains 700a-700N and the RAN antenna 702, utilizing the aggregated RF power of the N radio transceiver chains 700a-700N. The wireless BS 103c disconnects the N radio transceiver chains 700a-700N from the RAN antenna 702. The wireless BS 103c connects the N radio transceiver chains 700a-700N to N backhaul antennas 701a, 701b, to 701N, belonging to the wireless BS 103c. At least some of the data is wirelessly communicated, via the N radio transceiver chains 700a-700N and the N backhaul antennas 701a-701N, between the wireless BS 103c and a wireless transceiver 102 of the Core Network 100.

In one embodiment, there is system for wirelessly relaying data between a Core Network 100 and a Radio Access Network (RAN) 101, the system including (1) N radio transceiver chains 700a-700N, wherein N is equal to at least two, (2) a RAN antenna 702 covering a first location of at least one wireless Subscriber Stations (SS) 111a-111K, (3) N Backhaul antennas 701a-701N covering a second location of a wireless transceiver belonging to the Core Network 100, (4) N RF switches (either 731a, 732a, and 733a, or 731b, 732b and 733b, depending on whether radio transceiver chains 701a-701N are connected to an RF power combiner 709 or the N backhaul antennas 701a-701N, respectively); and an RF power combiner 709, wherein the system communicates data wirelessly with at least one wireless SS 111a-111K, via the N radio transceiver chains 700a-700N connected to the RAN antenna 702 via the RF power combiner 709 utilizing the aggregated RF power of the N radio transceiver chains 700a-700N, then switches the N radio transceiver chains 700a-700N from the RAN antenna 702 to the N Backhaul antennas 701a-701N using the N RF switches (731a-733a an 731b-733b), and communicates wirelessly at least some of the data, via the N radio transceiver chains 700a-700N and the N Backhaul antennas 701a-701N, with the wireless transceiver 102 of the Core Network 100.

Figure 8:
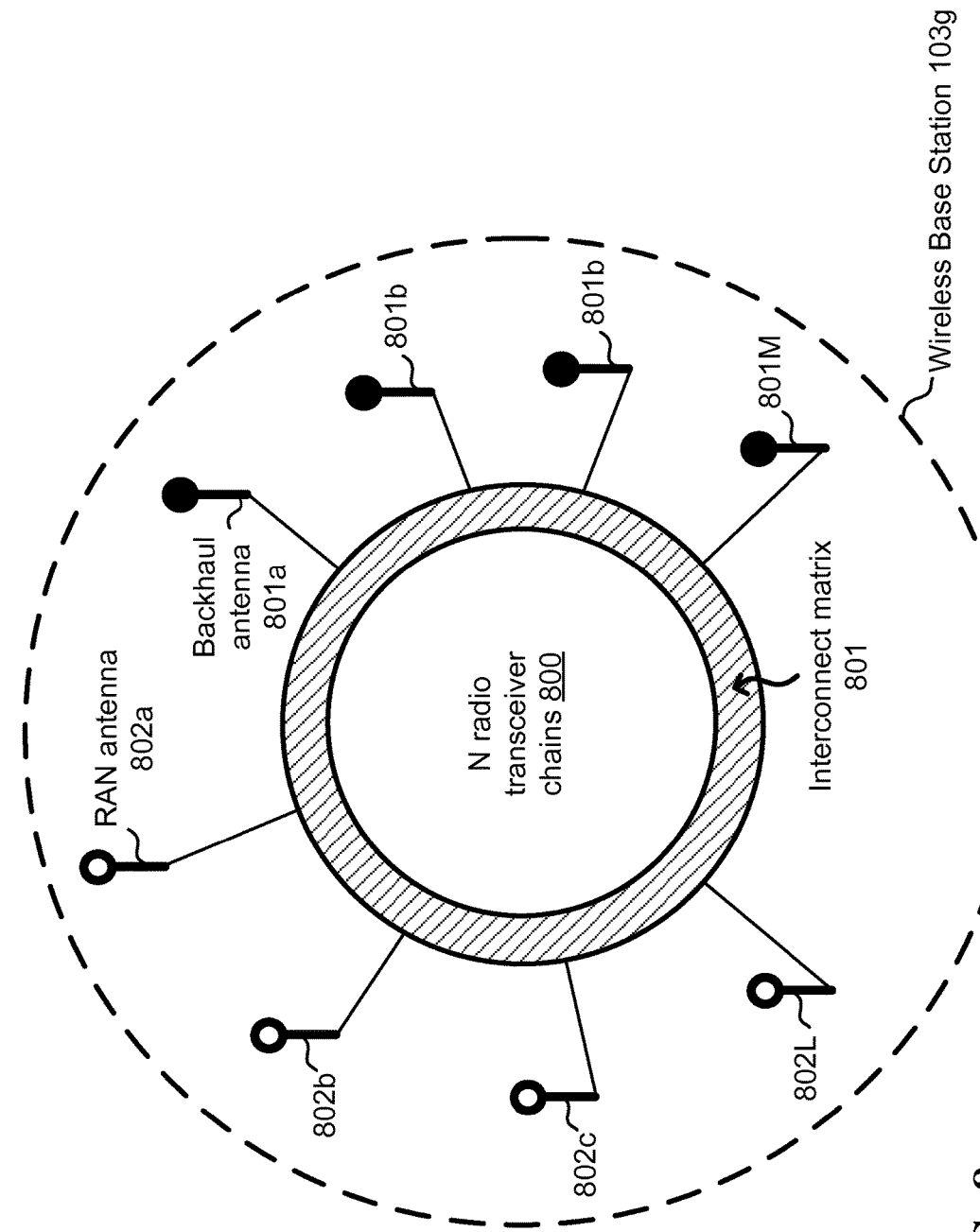
FIG. 8 illustrates one embodiment of components comprising a system in which any number of RAN antennas are connected by N radio receiver chains and an Interconnect matrix to any number of Backhaul antennas.

In one embodiment, there is a system for wirelessly relaying data between a Core Network and a Radio Access Network (RAN). Structural elements of this system are illustrated in FIG. 8, in which the system includes (1) N radio transceiver chains 800, wherein N is equal to at least two, (2) L RAN antennas 802a-802L (including 802a, 802b, 802c, and 802L, in FIG. 8) covering a first location of at least one wireless Subscriber Stations (SS) 111a-111K (not shown in FIG. 8), wherein L is equal to or less than N, (3) M Backhaul antennas 801a-801M (including 801a, 801b, 801c and 801M, in FIG. 8) covering a second location of a wireless transceiver 102 belonging to the Core Network 100, wherein M is equal to or less than N; and (4) an interconnect matrix 801 switching and power combine the N radio transceiver chains 800 with the L RAN antennas 802a-802L and the M Backhaul antennas 801a-801M. This system communicates data wirelessly with at least one wireless SS 111a-111K, via at least two of the N radio transceiver chains 800 connected to at the least one of the L RAN antennas 802a-802L via the interconnect matrix 801, connects at least two of the N radio transceiver chains 802a-802L to at least one of the M Backhaul antennas 801a-801M using the interconnect matrix 801; and communicates wirelessly at least some of the data, via the recently connected radio transceiver chains 800 and the at least one of the M Backhaul antennas 801a-801M, with the wireless transceiver 102 of the Core Network 100.

Figure 9:
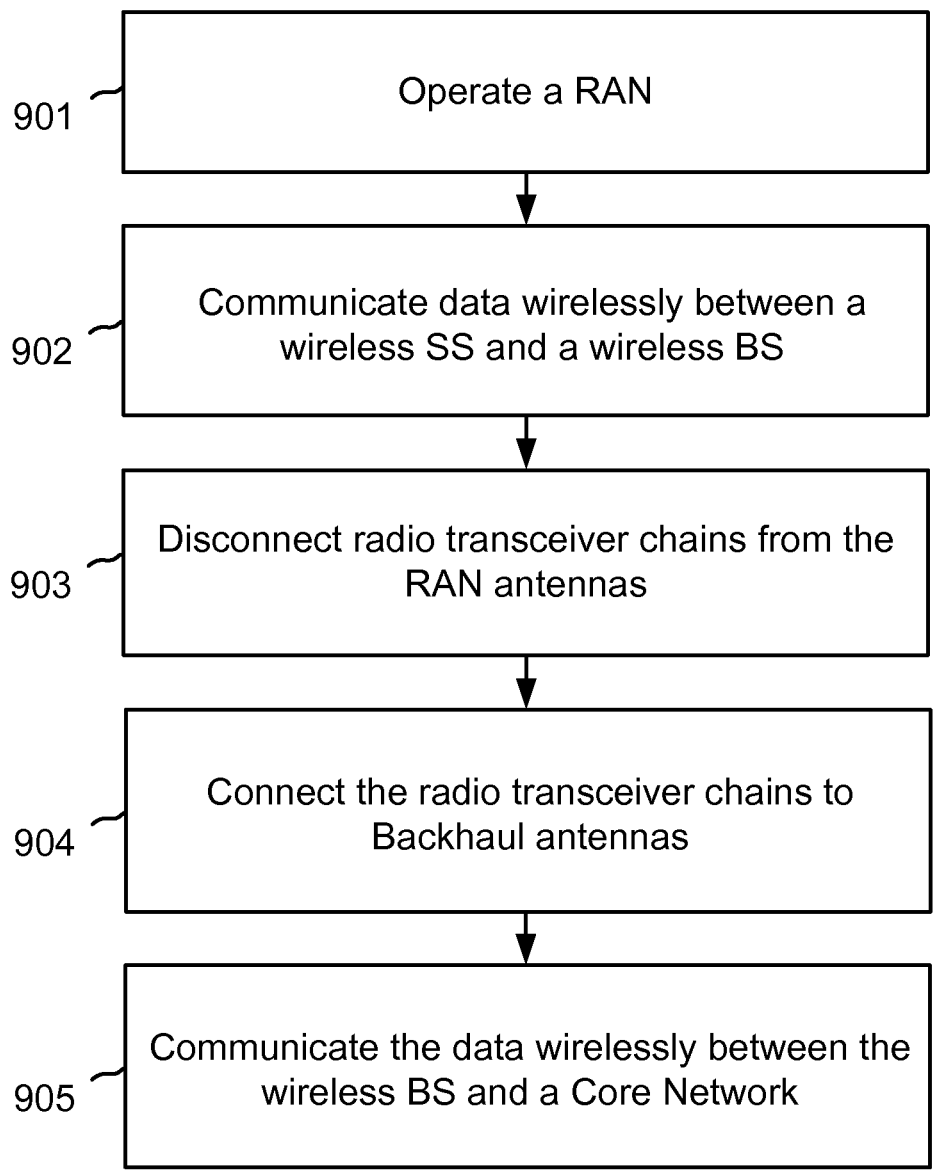
FIG. 9 illustrates one embodiment of the elements of a method in which data is wirelessly relayed between a RAN and a Core Network.

FIG. 9 illustrates a flow diagram describing one method for wirelessly relaying data between a Core Network 100 and a RAN 101, utilizing an aggregated Radio Frequency (RF) power of a plurality of radio transceiver chains 200a-200N. In step 901, operating a RAN 101, comprising a wireless Base Station (BS) 103, the wireless BS 103 comprising N radio transceiver chains 200a-200N and corresponding N RAN antennas 202a-202N, wherein N is equal to at least two. In step 902, communicating data wirelessly between at least one wireless Subscriber Station (SS) among 111a-111K and the wireless BS 103, via the N radio transceiver chains 200a-200N and the corresponding N RAN antennas 202a-202N. In step 903, disconnecting, by the wireless BS 103, the N radio transceiver chains 200a-200N from the N RAN antennas 202a-202N. In step 904, connecting, by the wireless BS 103, the N radio transceiver chains 200a-200N to N radio signal pathways 20a-20N leading to M Backhaul antennas 201a-201M belonging to the wireless BS 103. In step 905, wirelessly communicating at least some of the data, via the N radio transceiver chains 200a-200N and the M Backhaul antennas 201a-201M, between the wireless BS 103 and a wireless transceiver of the Core Network 102, utilizing the aggregated RF power of the N radio transceiver chains 200a-200N.

Figure 10:
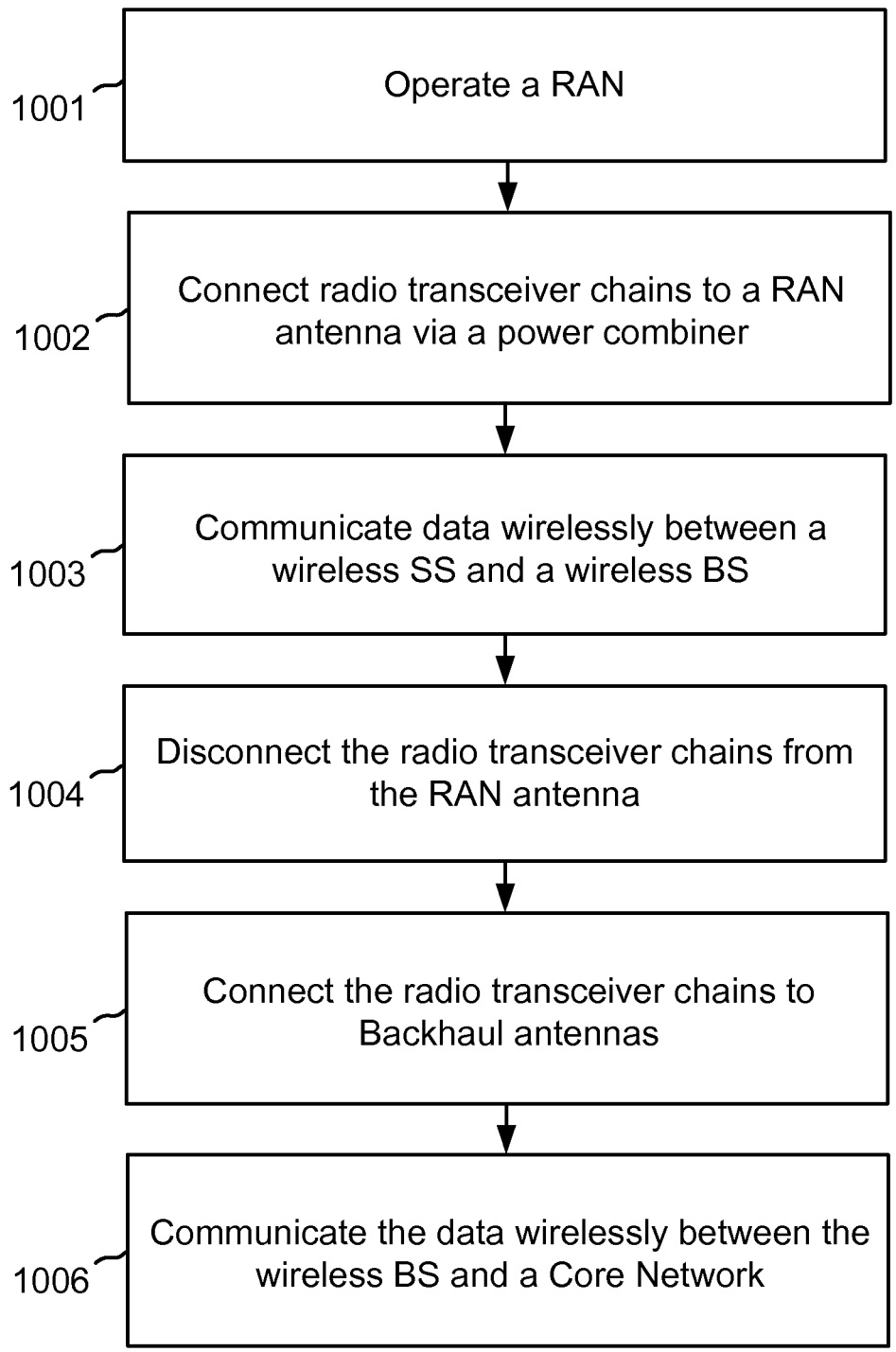
FIG. 10 illustrates one embodiment of the elements of a method in which data is wirelessly relayed between a Core Network and a RAN.

FIG. 10 illustrates a flow diagram describing one method for wirelessly relaying data between a Core Network 100 and a RAN 101, utilizing an aggregated Radio Frequency (RF) power of a plurality of radio transceiver chains 700a-700N. In step 1001, operating a RAN, comprising a wireless Base Station (BS) 103c, the wireless BS 103c comprising N radio transceiver chains 700a-700N and a RAN antenna 702, wherein N is equal to at least two. In step 1002, connecting the N radio transceiver chains 700a-700N to the RAN antenna 702. In step 1003, communicating data wirelessly between at least one wireless Subscriber Station (SS) among 111a-111K and the wireless BS 103c, via the N radio transceiver chains 700a-700N and the RAN antenna 702, utilizing the aggregated power RF power of the N radio transceiver chains 700a-700N. In step 1004, disconnecting, by the wireless BS 103c, the N radio transceiver chains 700a-700N from the RAN antenna 702. In step 1005, connecting, by the wireless BS 103c, the N radio transceiver chains 700a-700N to N backhaul antennas 701a-701N. In step 1006, wirelessly communicating at least some of the data, via the N radio transceiver chains 700a-700N and the N backhaul antennas 701a-701N, between the wireless BS 103c and a wireless transceiver of the Core Network 102.

As used herein, "client units" means consumer communication devices. Such devices may be fixed in space, or mobile, or portable. Such devices may be telephones, pagers, computers, or any other electronic communication device.

As used herein, "communication parameters" are definitions or criteria used to enable different units in a communication to communicate with one another, or to enhance the quality of communication between units in the systems. Some possible examples of parameters which might be applied are frequency, data rate, air protocol, transmission times, and others.

As used herein, "multiple-region-coverage" means a situation in which the transmission from an infrastructure transceiver provides substantial radiation to two or more geographical regions in a communication network.

Figure 11:
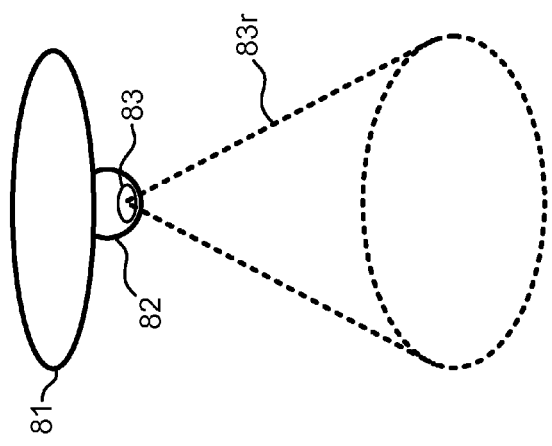
FIG. 11 illustrates one embodiment of a base-station in-motion, including the radiation pattern and coverage area of such base-station.

FIG. 11 illustrates one embodiment of a base-station in-motion, including the radiation pattern and coverage area of such base-station. FIG. 11 shows a mobile platform 81, which may be an airplane, helicopter, airship, or other aerial platform. An airborne base-station 82 is located on the mobile platform 81. The base-station 82 includes a first antenna configuration 83 which generates a first transmission radiation pattern 83r. The depiction in FIG. 11 is such that the transmission pattern is directional and the coverage is circular about a central point, but it is understood that different first radiation patterns are possible in which the coverage area would not be circular.

Figure 12A:
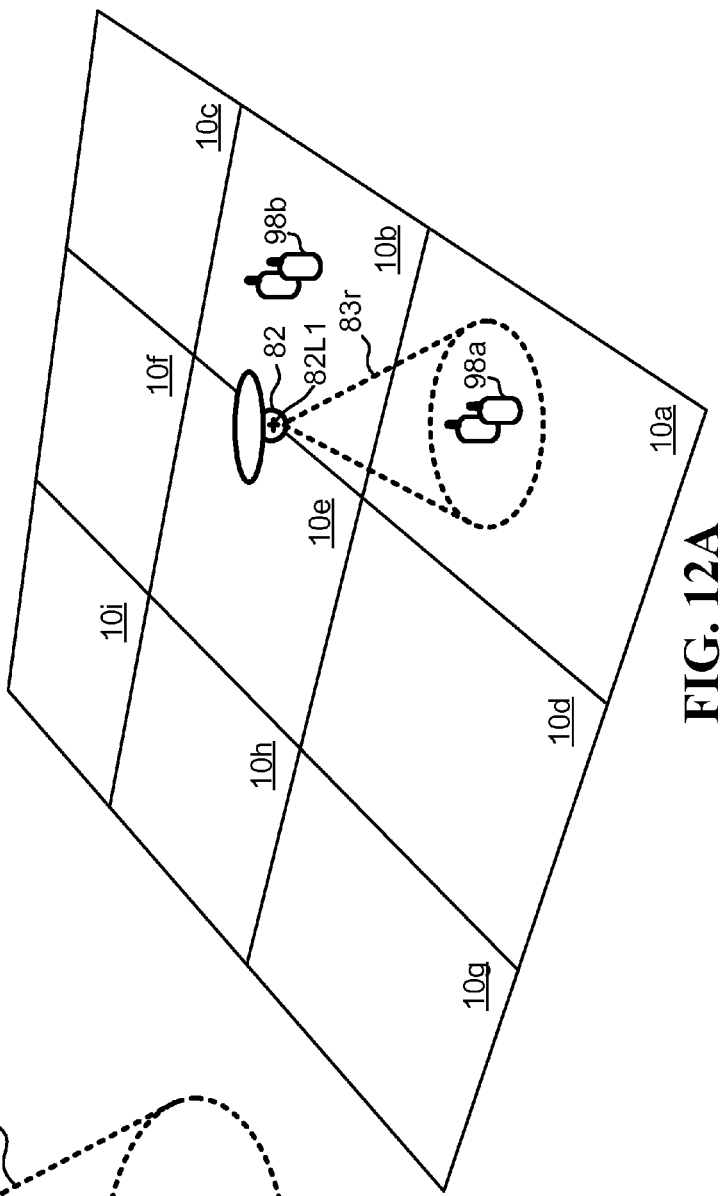
FIG. 12A illustrates one embodiment of an electronic communication system in which there is a base-station in-motion that services one geographical region.

FIG. 12A illustrates one embodiment of an electronic communication system in which there is a base-station in-motion that services one geographical region. In FIG. 12A, a certain space has been divided into different geographical regions, here marked as 10a, 10b, 10c, 10d, 10e, 10f, 10g, 10h, and 10i. Although there are shown nine geographical regions, each a square, there may be any number of geographical regions of two or more, and each geographical region may be of any shape. Further, these geographical regions may be defined according to regulatory restrictions, such that each geographical region has different regulatory restrictions. In FIG. 12A, there are client units 98a operating in region 10a, and different client units 98b operating in region 10b. In FIG. 12A, the mobile platform with base-station 82 is located in a first aerial position 82L1, such that the transmission radiation pattern 83r will provide coverage to client units 98a.

Figure 12B:
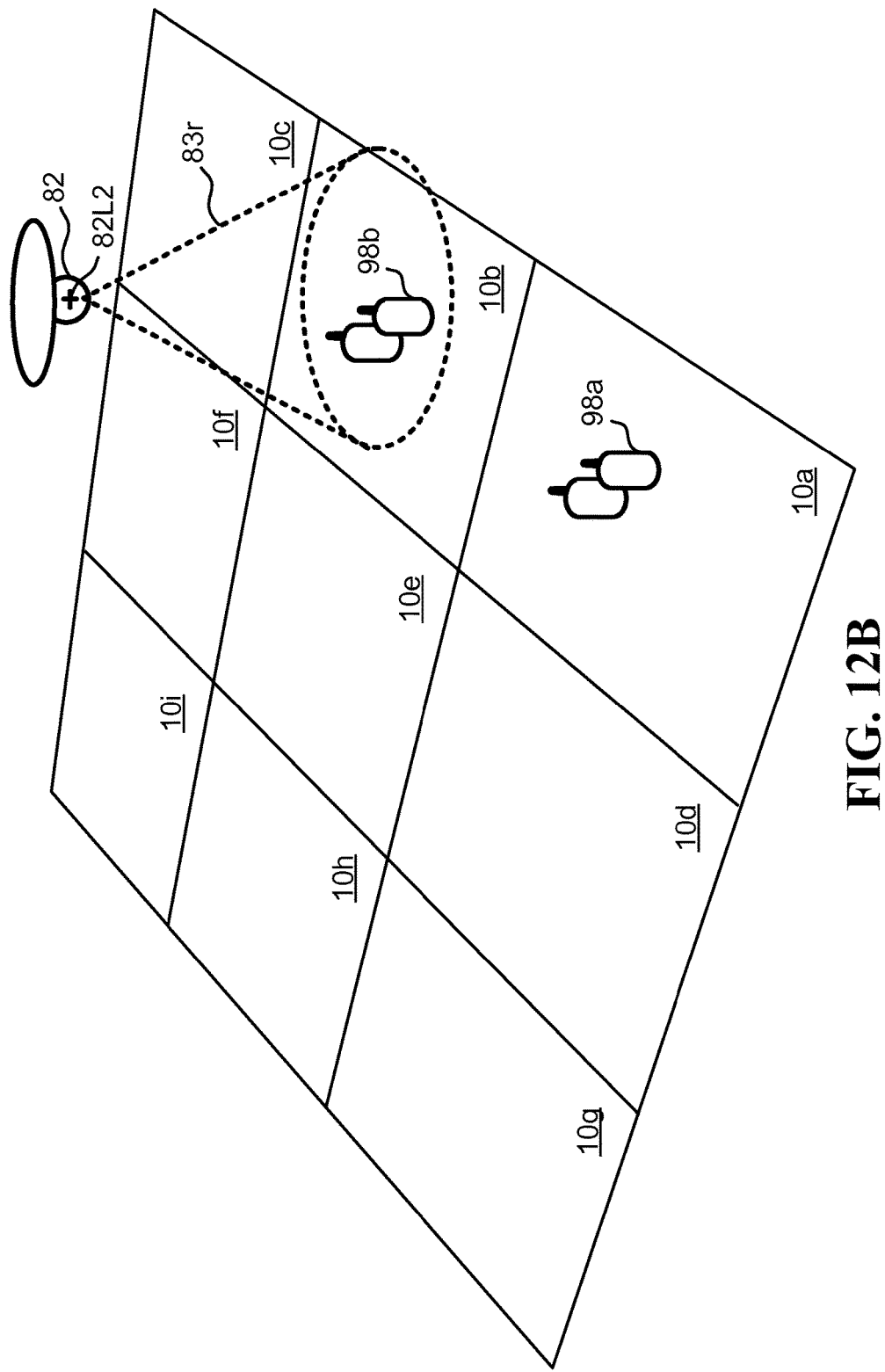
FIG. 12B illustrates one embodiment of an electronic communication system in which there is a base-station in-motion that services one or more geographical regions, and in which the coverage of the base-station in-motion has moved from a first geographical region to a second geographical region.

FIG. 12B illustrates one embodiment of an electronic communication system in which there is a base-station in-motion that services one or more geographical regions, and in which the coverage of the base-station in-motion has moved from a first geographical region to a second geographical region. As depicted in FIG. 12B, the mobile platform with base-station 82 has moved to a second aerial position 82L2 such that the transmission radiation pattern 83r, which has not changed from the pattern in FIG. 12A, now provides coverage to client units 98b which are located in the second geographical area 10b. In the graphic depiction of FIG. 12B, there is no problem of multiple-region-coverage.

Figure 12C:
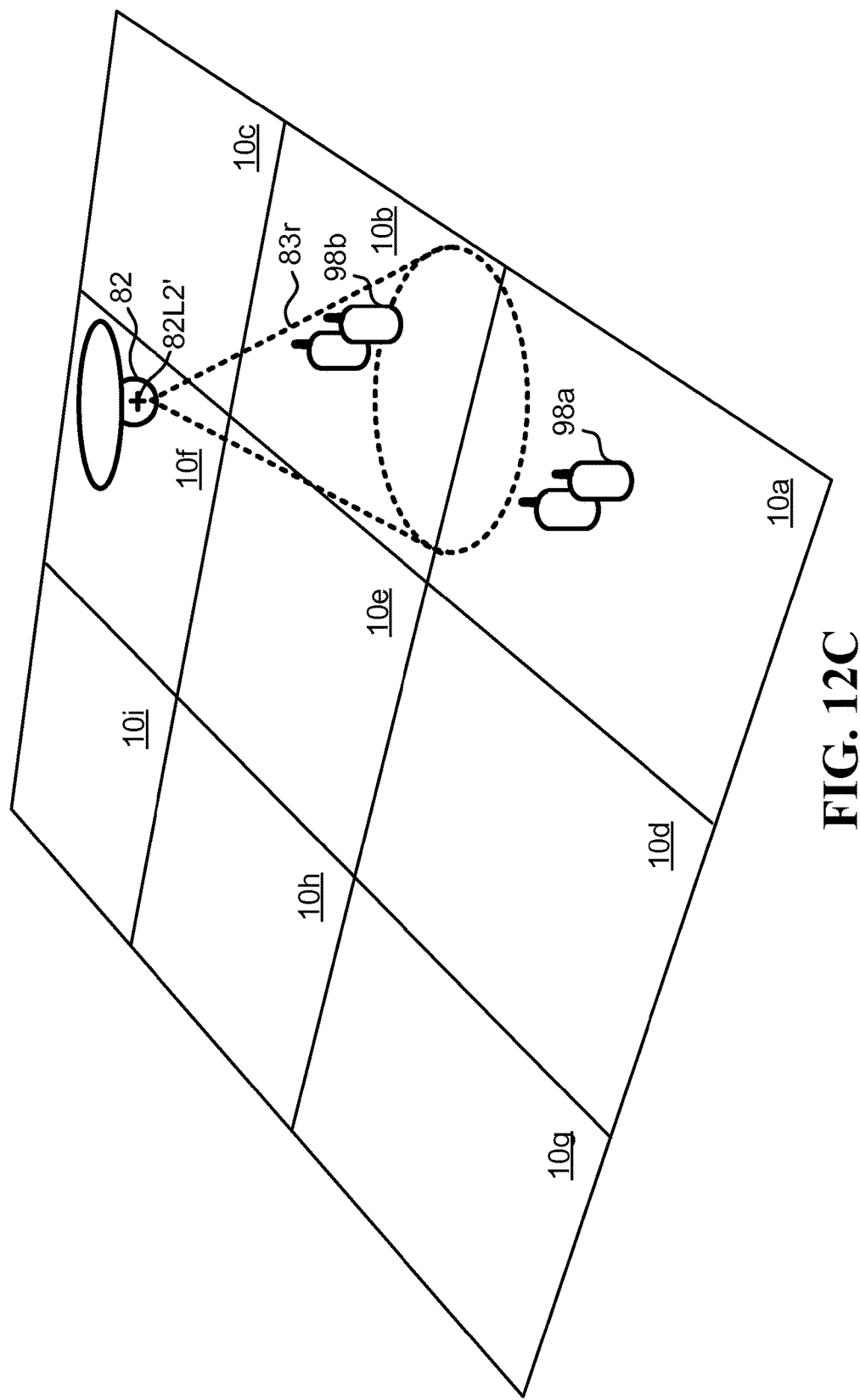
FIG. 12C illustrates one embodiment of an electronic communication system in which there is a base-station in-motion that services one or more geographical regions, and in which the base-station in-motion has moved such that its coverage area includes two or more geographical regions. Coverage of two regions is shown in FIG. 12C, but there may be covered three regions or any number of regions higher than three.

FIG. 12C illustrates one embodiment of an electronic communication system in which there is a base-station in-motion that services one or more geographical regions, and in which the base-station in-motion has moved such that its coverage area includes two or more geographical regions.

Coverage of two regions is shown in FIG. 12C, but there may be covered three regions or any number of regions higher than three.

As depicted in FIG. 12C, the mobile platform with base-station 82 has moved from the original aerial position 82L1 to a second aerial position 82L2' such the transmission radiation pattern 83r, which has not changed from the pattern in FIG. 12A, now provides coverage to parts of geographic regions 10a and 10b. This is a depiction of a multiple-region-coverage problem. It is possible that there will be transmission coverage to client units in either 10a, or in 10b, or in both 10a and 10b, but there is nevertheless a problem because there may be different transmission parameters between those in 10a and those in 10b. Further, when there are multiple mobile platforms, a situation depicted and described in FIG. 15 below, situations with multiple-region-coverage can negatively impact, in a significant manner, overall system performance.

FIG. 12D illustrates one embodiment of an electronic communication system in which there is a base-station in-motion that services one or more geographical regions, and in which the problem of multiple-region-coverage depicted in FIG. 12C has been resolved by redirecting the radiation pattern of the base-station in-motion to cover only a single geographical region. In FIG. 12D, the aerial position 82L2' of the mobile platform has not changed from the position in FIG. 12C, but transmission radiation pattern has now been changed to 83r2, such that the area of coverage has been redirected from a multiple-region-coverage problem of 10a and 10b to coverage of client units 98b in region 10b. The coverage pattern may be elliptical as shown in the pattern in region 10b of FIG. 12D.

FIG. 12E illustrates one embodiment of a base-station in-motion in which the direction of the radiation generated by the base-station has been changed in order to avoid or solve the problem of multiple-region-coverage. In FIG. 12E, the antenna configuration of base-station 82 has been changed to a second antenna configuration 83b, and this change also redirects the radiation pattern to a second radiation pattern 83r2.

Figure 13A:
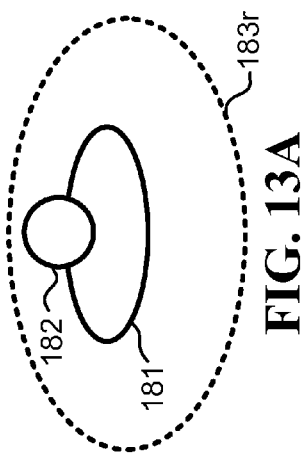
FIG. 13A illustrates one embodiment of a base-station in-motion, including the coverage area of such base-station. In contrast to FIG. 11A which depicts an aerial base-station, the base-station in-motion in FIG. 13A may be air-based, land-based, or water-based, but in every case it moves through a physical medium.

FIG. 13A illustrates one embodiment of a base-station in-motion, including the coverage area of such base-station. In contrast to FIG. 11A which depicts an aerial base-station, the base-station in-motion in FIG. 13A may be air-based, land-based, or water-based, but in every case it moves through a physical medium. In FIG. 13A, a first base-station 182 is located on mobile platform 181, and has a transmission radiation pattern 183r.

Figure 13B:
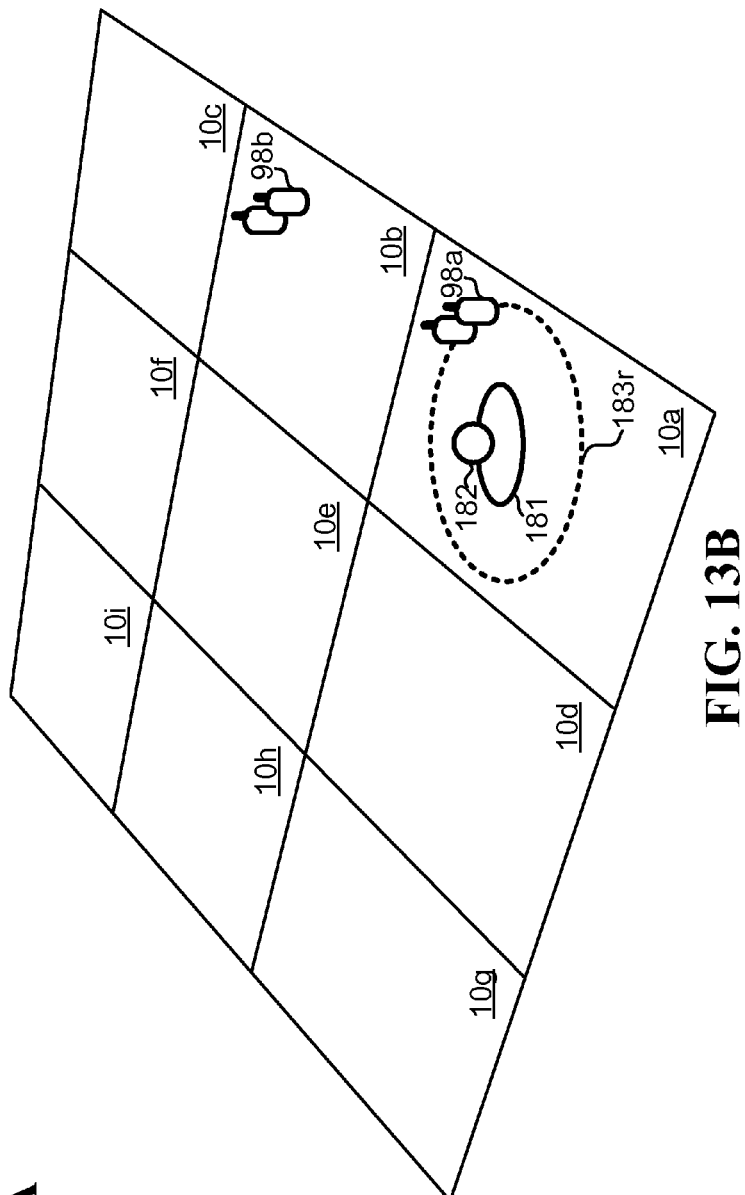
FIG. 13B is illustrates one embodiment of the base-station in-motion from FIG. 13A, in which the base-station in-motion services one geographical region.

FIG. 13B illustrates one embodiment of the base-station in-motion from FIG. 13A, in which the base-station in-motion services one geographical region. The base-station 181, located on mobile platform 182, is located in geographical region 10a, such that radiation pattern 183r provides coverage to client units 98a located in geographical region 10a, but does not provide coverage to client units 98b located in geographical region 10b.

Figure 13C:
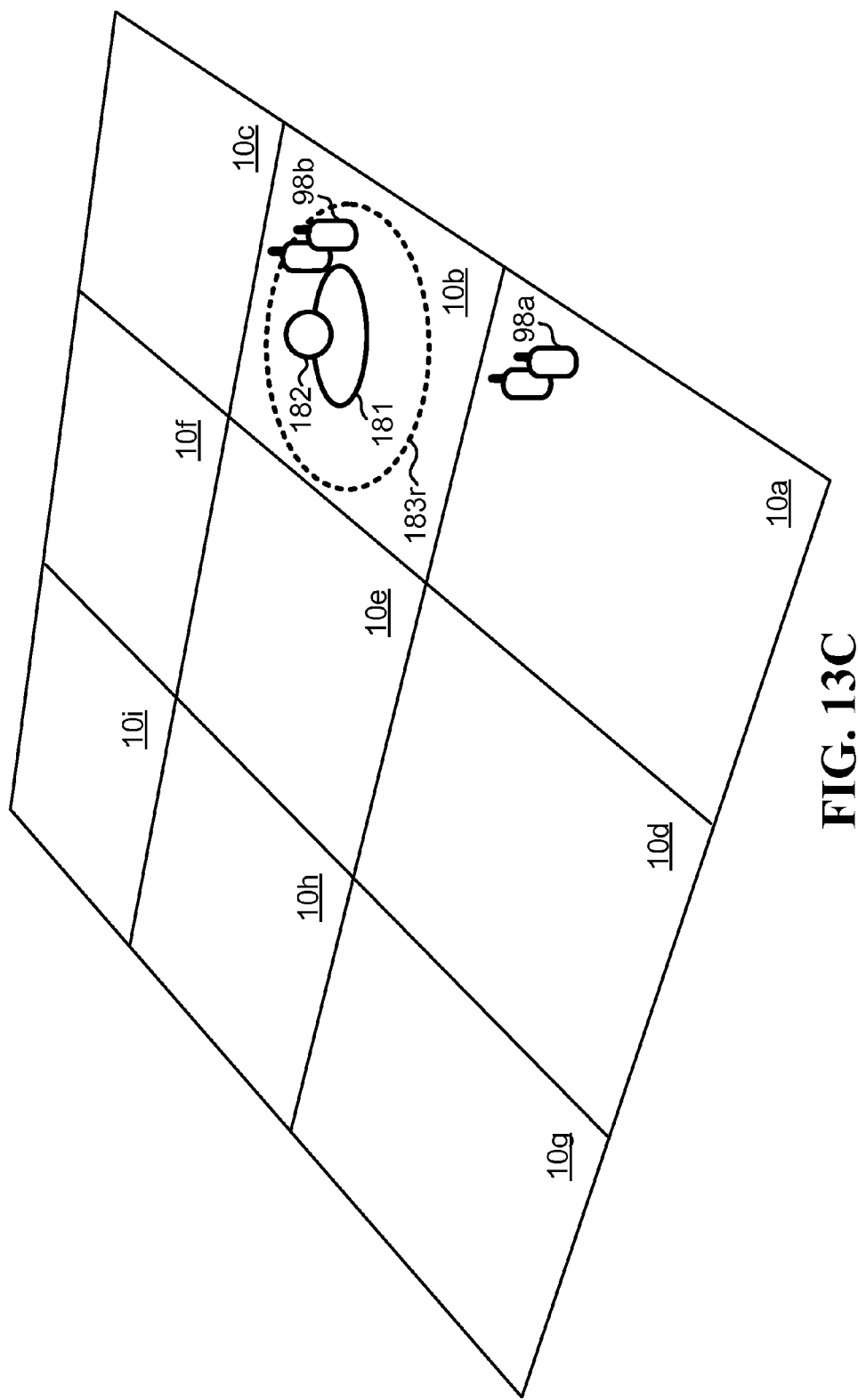
FIG. 13C illustrates one embodiment of the base-station in-motion from FIG. 13A and FIG. 13B, in which the base-station has moved from a first geographical region to a second geographical region, and the coverage area has moved from the first geographical area to the second geographical area.

FIG. 13C illustrates one embodiment of the base-station in-motion from FIG. 13A and FIG. 13B, in which the base-station has moved from a first geographical region to a second geographical region, and the coverage area has moved from the first geographical area to the second geographical area. In FIG. 13C, mobile platform 182, including base station 182, has moved from geographical region 10a to geographical region 10b. The radiation pattern 183r has not changed, but because of the movement of mobile platform 181, the radiation pattern 183r now provides coverage to client units 98b in geographical region 10b, but no longer provides geographical coverage to client units 98a in geographical region 10a.

Figure 14A:
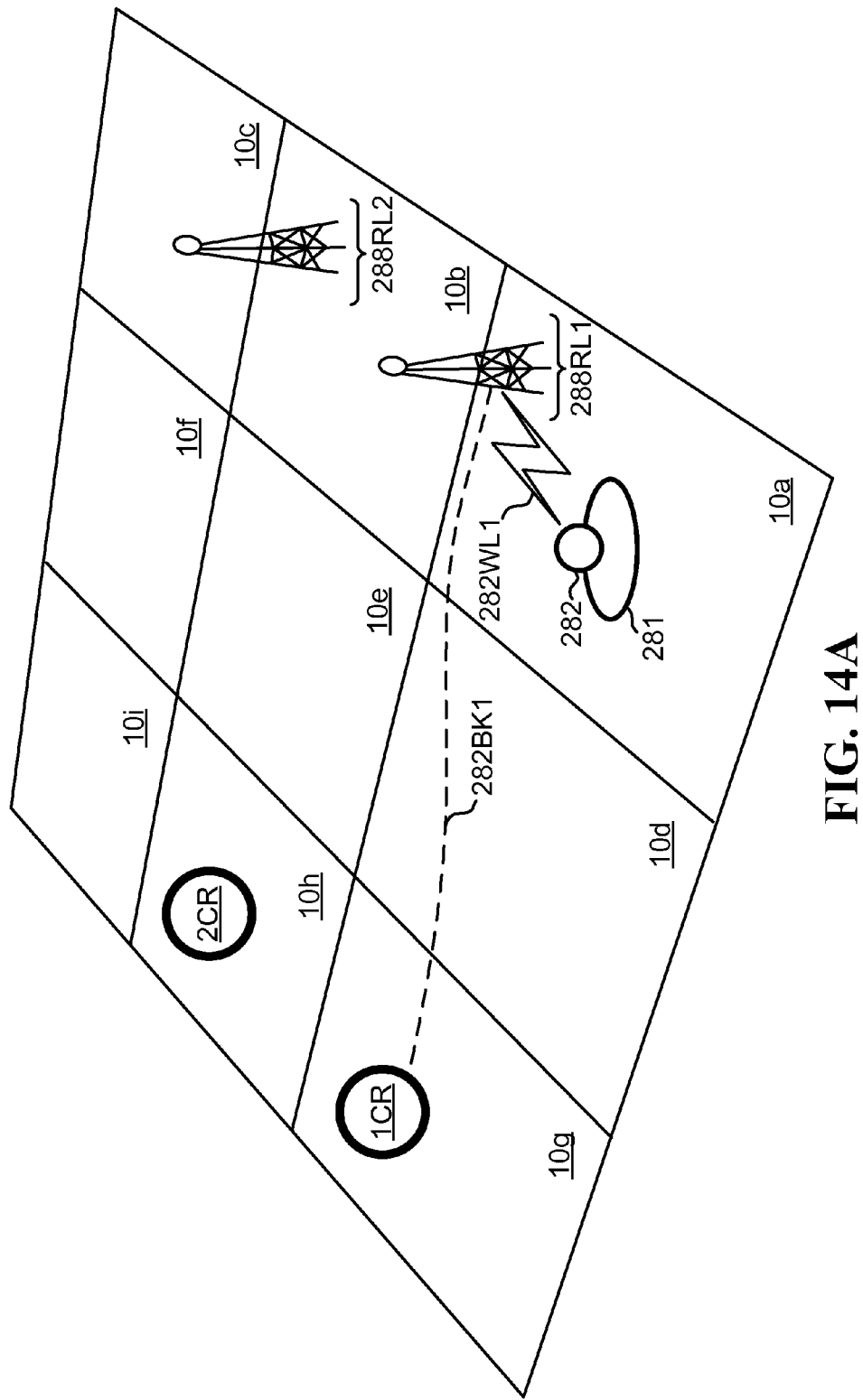
FIG. 14A illustrates one embodiment of a base-station in-motion servicing one geographical area that has established via relay station a backhaul link with a first core network.

FIG. 14A illustrates one embodiment of a base-station in-motion servicing one geographical area that has established via relay station a backhaul link with a first core network. In FIG. 14A, mobile platform 281, including base-station 282, is located in geographical region 10a. There is a first wireless link 282WL1 between the base-station 282 and a first relay station 288RL1 located in the geographical region 10a. There is also a first backhaul link 282BK1, between a first core network 1CR and the base-station 282, via the first relay station 288RL1. There is no communication between base station 282 and second relay station 288RL2, and hence no link between a second core network 2CR and base-station 282. In FIG. 14A, the first core network 1CR is located in geographical region 10g, and the second core network 2CR is located in geographic region 10h. Alternative placements are possible, provided that the relay stations 288RL1 and 288RL2 are located in different geographical regions.

Figure 14B:
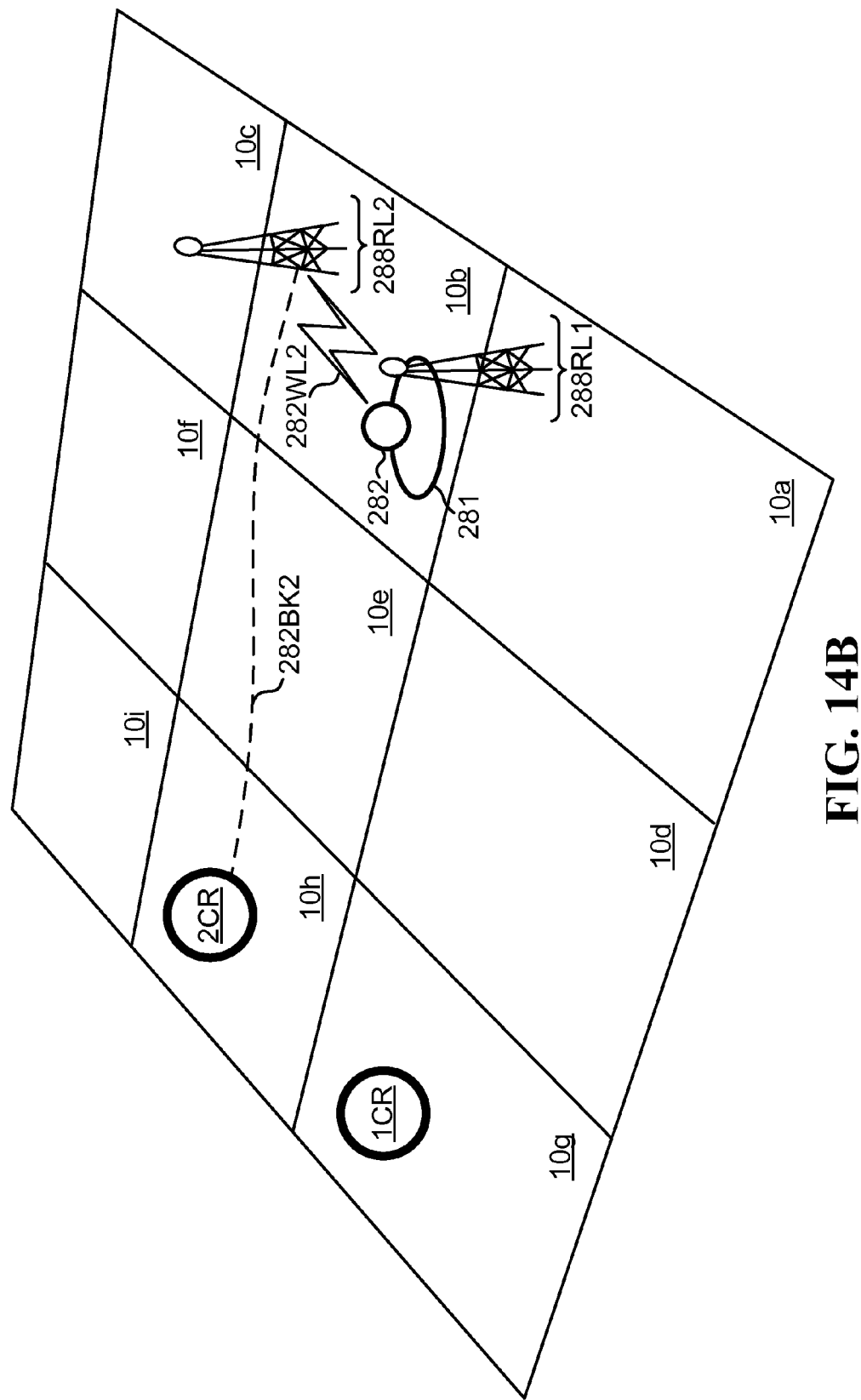
FIG. 14B illustrates one embodiment of the base-station in-motion from FIG. 14A, in which the base-station has moved from the first geographical region to a second geographical region, and has established via a second relay station a backhaul link with a second core network.

FIG. 14B illustrates one embodiment of the base-station in-motion from FIG. 14A, in which the base-station has moved from the first geographical region to a second geographical region, and has established via a second relay station a backhaul link with a second core network. In FIG. 14B, mobile platform 281 with base-station 282 has now moved from geographical region 10a to geographical region 10b. There is a first wireless link 282WL2 between the base-station 282 and a second relay station 288RL2 located in the geographical region 10b. There is also a second backhaul link 282BK2, between a second core network 2CR and the base-station 282, via the second relay station 288RL2. There is no communication between base station 282 and first relay station 288RL1, and hence no link between the first core network 1CR and base-station 282. In FIG. 14B, the first core network 1CR is located in geographical region 10g, and the second core network 2CR is located in geographic region 10h. Alternative placements are possible, provided that the relay stations 288RL1 and 288RL2 are located in different geographical regions.

Figure 15:
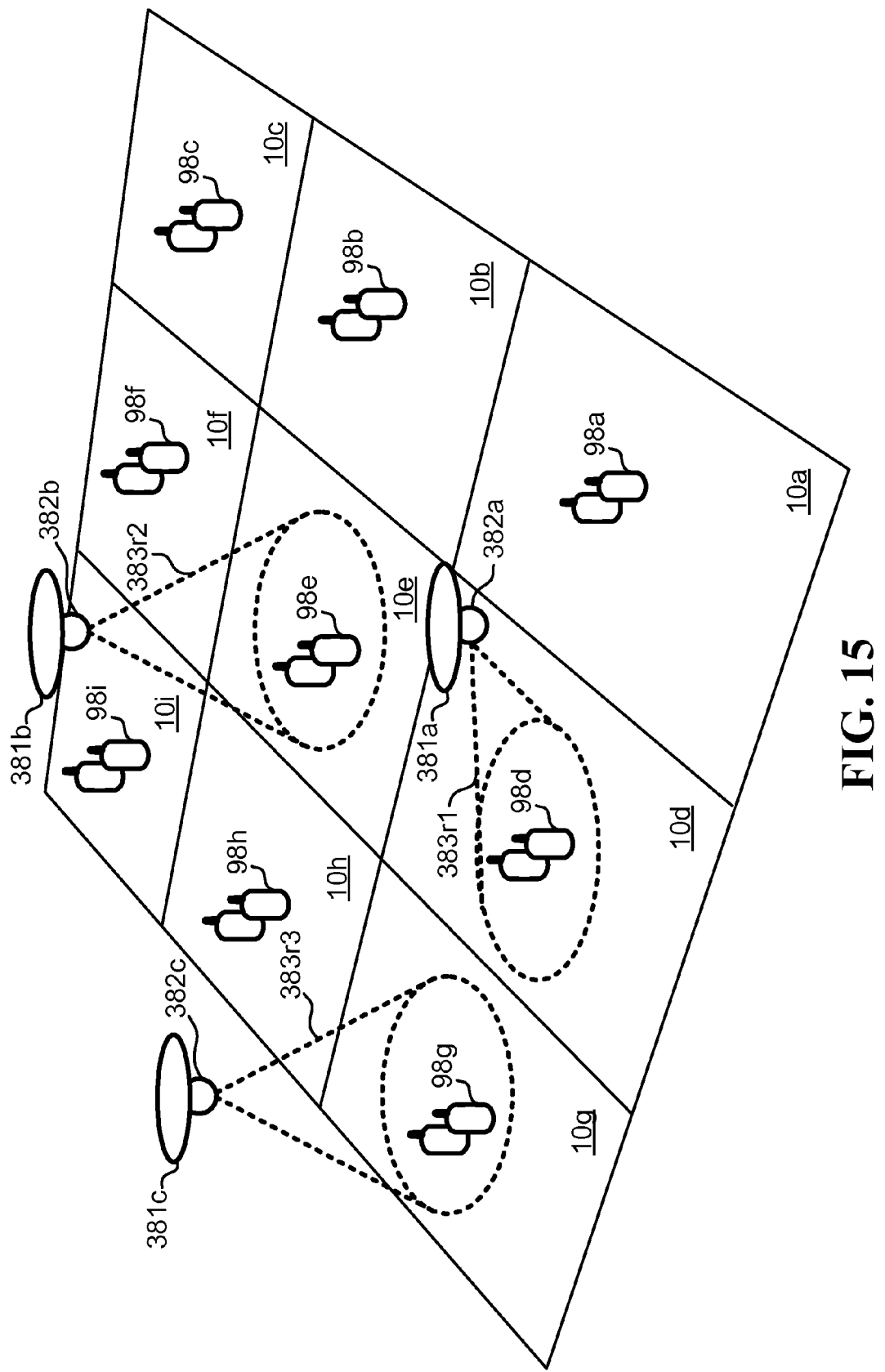
FIG. 15 illustrates one embodiment of multiple base-stations in-motion, in which each such base-station services a different geographical region, and in which the radiation pattern of any such base-station may be redirected to avoid or solve any problem of multiple-region-coverage.

FIG. 15 illustrates one embodiment of multiple base-stations in-motion, in which each such base-station services a different geographical region, and in which the radiation pattern of any such base-station may be redirected to avoid or solve any problem of multiple-region-coverage. In FIG. 15, mobile platform 381a includes base-station 382a with transmission radiation pattern 383r1 providing service to client units 98d located in geographical region 10d. In FIG. 15, mobile platform 381b includes base-station 382b with transmission radiation pattern 383r2 providing service to client units 98e located in geographical region 10e. In FIG. 15, mobile platform 381c includes base-station 382c with transmission radiation pattern 383r3 providing service to client units 98g located in geographical region 10g. The other client units depicted in FIGS. 15, 98a, 98b, 98c, 98f, 98h, and 98i, are not serviced by any of base-stations 382a, 382b, and 382c, although they may be serviced by other base-stations not shown in FIG. 15.

FIG. 15 depicts three mobile platforms, although the number of mobile platforms may be two or any number higher than two. In FIG. 15, two of the platforms, 381b and 381c, have base-stations, 382b and 382c respectively, with directional transmission radiation patterns, 383r2 and 383r3 respectively, producing coverage patterns, 98e and 98g respectively, where each such pattern is circular about a central point. In FIG. 15, there is one platform 381a, with base-station 382*a*, having a redirected transmission radiation pattern 383*r*1, such that the coverage pattern may be elliptical. It will be understood that there may be any number of mobile platforms, that any number of such mobile platforms may have base-stations with directional radiation patters, and that any number of such mobile platforms may have base-stations with redirected transmission radiation patterns. It will be understood that although FIG. 15 shows three airborne mobile platforms, there may be any number of mobile platforms that are airborne, or terrestrial, or waterborne. The only requirements of the multiple mobile platforms in FIG. 15 are that there be at least two mobile platforms, in which each of the two platforms serves a different geographical area. FIG. 15 shows that each of three geographical regions, 10*d*, 10*e*, and 10*g*, is serviced by a single mobile platform, but this is not required. A geographical region may be serviced by two or more mobile platforms.

One embodiment is a transmission system in-motion that is operative to adapt to changing geographical regions. In one specific embodiment, the transmission system includes at least one mobile transport platform, any or all of 381*a*, 381*b*, and 381*c*, in which at least one of such platforms is operative to move between different geographical regions such as 10*a*, 10*b*, 10*c*, 10*d*, 10*e*, 10*f*, 10*g*, 10*h*, and 10*i*. The system includes also a first transmitter, any or all of 382*a*, 382*b*, and 382*c*, wherein each such transmitter is located onboard one of the mobile transport platforms 381*a*, 381*b*, and 381*c*, and is operative to: (i) dynamically select sets of communication parameters according to location of the first transmitter relative to the geographical regions, and each of the sets of communication parameters is associated with one of the geographical regions, and (ii) transmit wirelessly to a receiver of at least one client unit, any or all of 98*d*, 98*e*, and 98*g*, where each client unit is located in a specific geographical region, 10*d*, 10*e*, or 10*g*, and the transmitter uses a specific set of communication parameters associated with the specific geographical region in which the transmitter is locate. Further, the transmitter transmits only after the system has concluded that such transmission will not adversely affect communication in at least one of the other geographical regions, 10*a*, 10*b*, 10*c*, 10*f*, 10*h*, and 10*i*.

In a first alternative embodiment to the system just described, the first transmitter, 382*a*, 382*b*, or 382*c*, includes a first antenna configuration having a first transmission radiation pattern, 383*r*1, 383*r*2, or 383*r*3, respectively, and the first system is operative to reach the conclusion of no adverse effect by simulating an effect of transmissions on at least one other geographical region using data including at least (i) location of the first transmitter, 382*a*, 382*b*, or 382*c*, and (ii) the first transmission radiation associated with that transmitter, 383*r*1, 383*r*2, or 383*r*3, respectively.

In a first variation of the first alternative embodiment just described, the system is further operative to change the first transmission radiation pattern to a second transmission radiation pattern that substantially does not adversely affect any of the geographical regions in which the transmitter is not located.

In a first configuration of the first variation just described, the system is operative to adapt the first antenna configuration to a second antenna configuration, such adaptation to support a second transmission radiation pattern that is achieved using one or more antenna techniques selected from the group including beam switching techniques, beam selection, phased array techniques, and null-steering techniques.

In a second alternative embodiment to the transmission system in-motion described above, the sets of communication parameters are associated with, respectively, sets of regulatory restrictions which are associated, respectively, with the different geographical regions.

In a first variation of the second alternative embodiment described above, the sets of regulator restrictions include communication parameters selected from the group including frequency, bandwidth, channel, transmit power, out of band emissions, communication protocol, communication standard, antenna gain, antenna type, beam width, and multiple antenna configuration.

Figure 16:
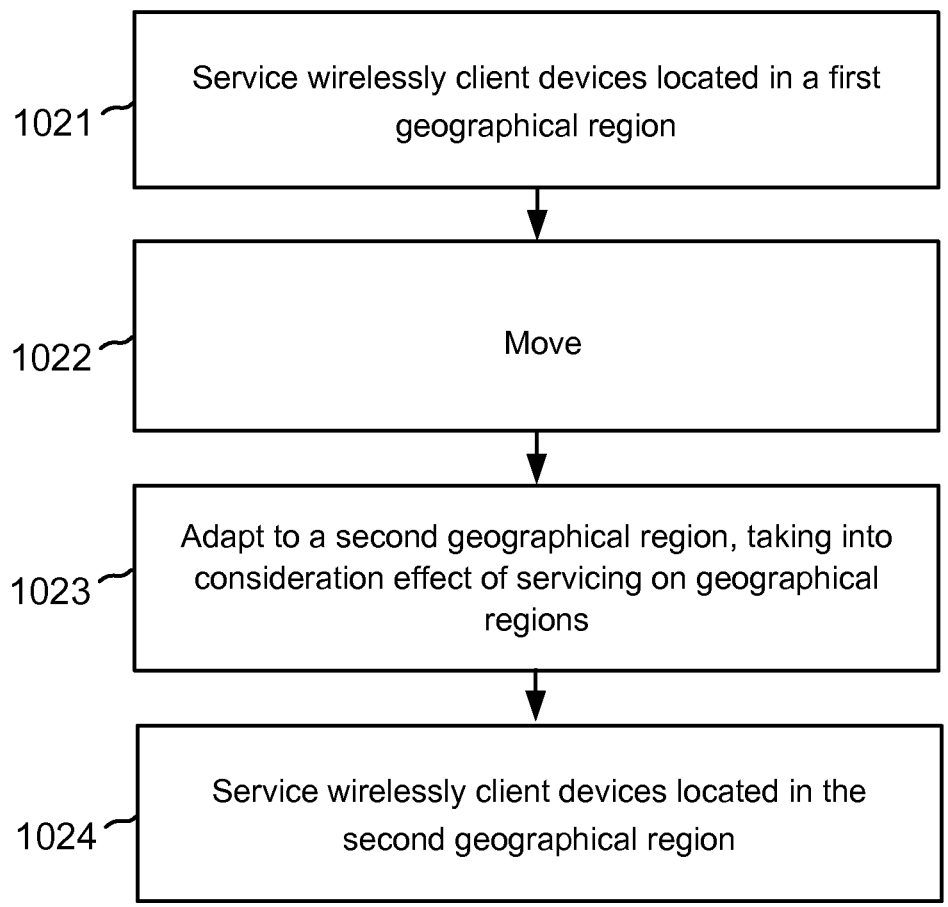
FIG. 16 illustrates one embodiment of a flow diagram describing one method by which a base-station in-motion may service two more geographical regions, in which the base-station services a first region, moves, and then services a second region.

FIG. 16 illustrates one embodiment of a method for adapting an airborne base-station in-motion to provide coverage first for one geographical area, and then for a different geographical area. In step 1012: a first airborne base station 82, located on a first mobile platform 81 in a first aerial position 82L1, services wirelessly, via a first antenna configuration 83 having a first transmission radiation pattern 83*r*, a first group of wireless client devices 98*a* located in a first geographical region 10*a*, using a first set of communication parameters associated with said geographical region 10*a*. In step 1022: the mobile platform 81 containing the base-station 82 moves from the first aerial position 82L1 to a second aerial position 82L2, in which the change of aerial position is associated with the change in coverage from a first geographical region 10*a* to a second geographical region 10*b*. In step 1023: the system takes into consideration an effect of the first transmission radiation pattern 83*r* on the first 10*a* and the second 10*b* geographical regions, and the system then adapts the transmission of the first base-station 82, from the first set of communication parameters associated with the first geographical region 10*a* to a second set of communication parameters associated with the second geographical region 10*b*. In step 1024: the first airborne base-station 82 uses the second set of communication parameters to service wirelessly a second group of wireless client devices 98*b* located in the second geographical location.

In a first alternative embodiment to the method just described, the system takes into consideration the effect of the first transmission radiation pattern 83*r* by determining that transmissions of base-station 82 using the second set of communication parameters will not adversely affect communication in the first geographical region 10*a*. As one non-limiting example, if the transmission radiation pattern 83*r* used in conjunction with the second set of communication parameters does not cover the first geographical region 10*a*, then the system will conclude that servicing using the second set of communication parameters is will not adversely affect communication in the first geographical region 10*a*.

In a first variation to the first alternative embodiment just described, additionally the system conducts a simulation using data that includes at least (i) the second aerial position 82L2 of the mobile platform 81, from which base-station 82 will generate transmissions, and (ii) the first transmission radiation pattern 83*r*. If the simulation suggests that wireless service using the second set of communication parameters will not be adversely impacted first geographical region 10*a*, that simulated result will be used to allow the system to adapt to the second set of communication parameters associated with the second geographical region 10*b*.

In a second alternative embodiment to the method described above for adapting an airborne base station in-motion, additionally the first and second sets of communication parameters are associated, respectively, with a first set and a second set of regulatory restrictions, which are associated, respectively, with the first geographical region 10*a* and the second geographical region 10*b*.

In a first variation to the second alternative embodiment just described, additionally each of the first and second sets of regulatory restrictions includes one or more communication parameters selected from a group consisting of frequency, bandwidth, channel, transmit power, out of band emissions, communication protocol, communication standard, antenna gain, antenna type, beam width, and multiple antenna configuration.

In a third alternative embodiment to the method described above for adapting an airborne base station in-motion, the system simulates the effect on the first geographical region 10a by using data that includes at least (1) the second aerial position 82L2' from which said transmissions will be sent by the base-station 82, and (ii) the first transmission radiation pattern 83r. Further, the system concludes on the basis of the simulation that geographical region 10a will be adversely affected by transmissions of the base-station 82 located at position 82L2' using the second set of communication parameters. This might be the case, for example, if the simulation suggests that the transmission radiation pattern used in conjunction with the second set of communication parameters will cover at least part of the first geographical region 10a. Further, as a result of the simulation, the system changes the transmission radiation pattern from the first transmission radiation pattern 83r to a second transmission radiation pattern 83r2 that substantially does not adversely affect communication in the first geographical region 10a. As one example, the second transmission radiation pattern 83r2 may be directed away from the first geographical area 10a, so that this pattern 83r2 illuminates only second geographical area 10b, thereby avoiding negative impact on first geographical area 10a when using the second set of communication parameters.

In a first variation to the third alternative embodiment just described, additionally the system changes the transmission radiation pattern from 83r to 83r2 using a second antenna configuration 83b in association with an antenna technique selected from the group of beam switching techniques, beam selection techniques, phased array techniques, and null-steering techniques.

Figure 17:
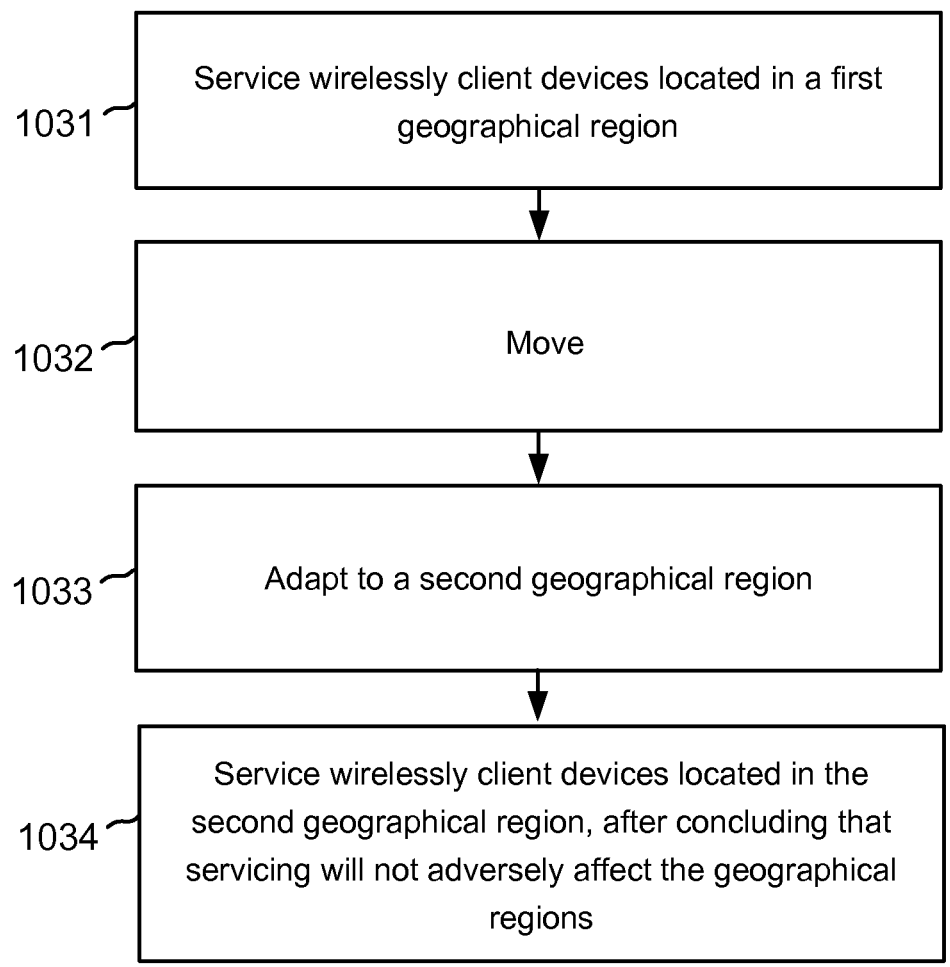
FIG. 17 illustrates one embodiment of a flow diagram describing one method by which a base-station in-motion may service two or more geographical regions, in which the base-station services a first region, moves, and then services a second region.

FIG. 17 illustrates one embodiment of a method for adapting a base-station in-motion to provide coverage first for one geographical area, and then for a different geographical area. In step 1031: a first base-station 182 located on a first mobile platform 181 located in a first geographical region 10a, uses a first set of communication parameters associated with the geographical region 10a to service wirelessly a first group of wireless client devices 98a located in geographical region 10a. In step 1032 mobile platform 181 containing base-station 182 moves from geographical region 10a to a second geographical region 10b. In step 1033: the first base-station 182 adapts its transmissions form the first set of communication parameters associated with geographical region 10a to a second set of communication parameters associated with geographical region 10b. In step 1034: the first base-station 182, located on wireless platform 181 now located in second geographical region 10b, concludes that servicing client units in second geographical region 10b will not adversely affect communications in first geographical region 10a, and then, uses the set of communication parameters associated with the second geographical region 10b, to service wirelessly a second group of wireless client devices 98b located in second geographical region 10b.

In a first alternative embodiment to the method just described, additionally the move from a first geographical region 10a to a second geographical region 10b is by a substantially continuous movement of the first base-station 182. Further, the move also includes the first base-station 182 detecting that the base-station 182 has crossed from the first geographical region 10a to the second geographical region 10b. It is this movement which calls for adaptation of the set of communication parameters.

In a first variation to the first alternative embodiment just described, further the second geographical region 10b is set apart from the first geographical region 10a by different regulatory restrictions.

In a first configuration to the first variation just described, the first and second sets of communication parameters are associated, respectively, with a first set and a second set of regulatory restrictions, which are associated, respectively, with the first geographical region 10a and the second geographical regions 10b.

In a second variation to the first alternative embodiment described above, the substantially continuous movement is selected from the group of (i) an undesired drift movement of a mobile transport platform 181 including the first base-station 182, and (ii) a loitering of a mobile transport platform 181 including the first base-station 182.

In a first configuration to the second variation just described, the mobile transport platform 181 is selected from a group including (i) an airborne system, (ii) a seaborne system, (iii) a land-based system, and (iv) a space-borne system.

In a second alternative embodiment to the method described above for adapting a base station in-motion to a new geographical region, adapting from a first set of communication parameters to a second set of communication parameters includes determining by the first base-station 182 the presence of the mobile platform 181 in the second geographical region 10b, extracting by the first base-station 182 from geographical data base the second set of communication parameters associated with the second geographical region 10b. One way in which determining presence in the second geographical region 10b may be by the use of GPS onboard the mobile platform 181 or in the first base-station 182.

In a first variation to the second alternative embodiment just described, the system further uses data gathered by the first base-station 182 while it is wirelessly servicing the second group of wireless client devices 98b, to adjust the second set of communication parameters to a third set of communication parameters. The system further changes the geographical data base by adding this third set of communication parameters, and it does so for the benefit of other base-stations in the system. As one non-limiting example, the system may conclude that transmission power may be reduced from level A to level B without seriously impacting service, and this new parameter will be used to update the geographical data base accordingly.

In a third alternative embodiment to the method described above for adapting a base station in-motion to a new geographical region, additionally the first base-station locates a second base-station previously or currently servicing client devices 98b in the second geographical region 1b. Further, the first base-station 182 extracts from the second base-station the second set of communication parameters.

In a fourth alternative embodiment to the method described above for adapting a base station in-motion to a new geographical region, each of the first and second sets of communication parameters is selected from a group including frequency, bandwidth, channel, transmit power, out of band emissions, communication protocol, communication standard, antenna gain, antenna type, beam width, and multiple antenna configuration.

In a fifth alternative embodiment to the method described above for adapting a base station in-motion to a new geographical region, further the system concludes that transmissions using the second set of communication parameters will not adversely affect communication in the first geographical region 10a by simulating the effect of transmissions using the second set of communication parameters on communication in the first geographical region 10a using data including (i) the position of the first base-station 182 from which the transmissions using the second set of communication parameters occur, and (ii) a first transmission radiation pattern 182r associated with the first base-station 182.

Figure 18:
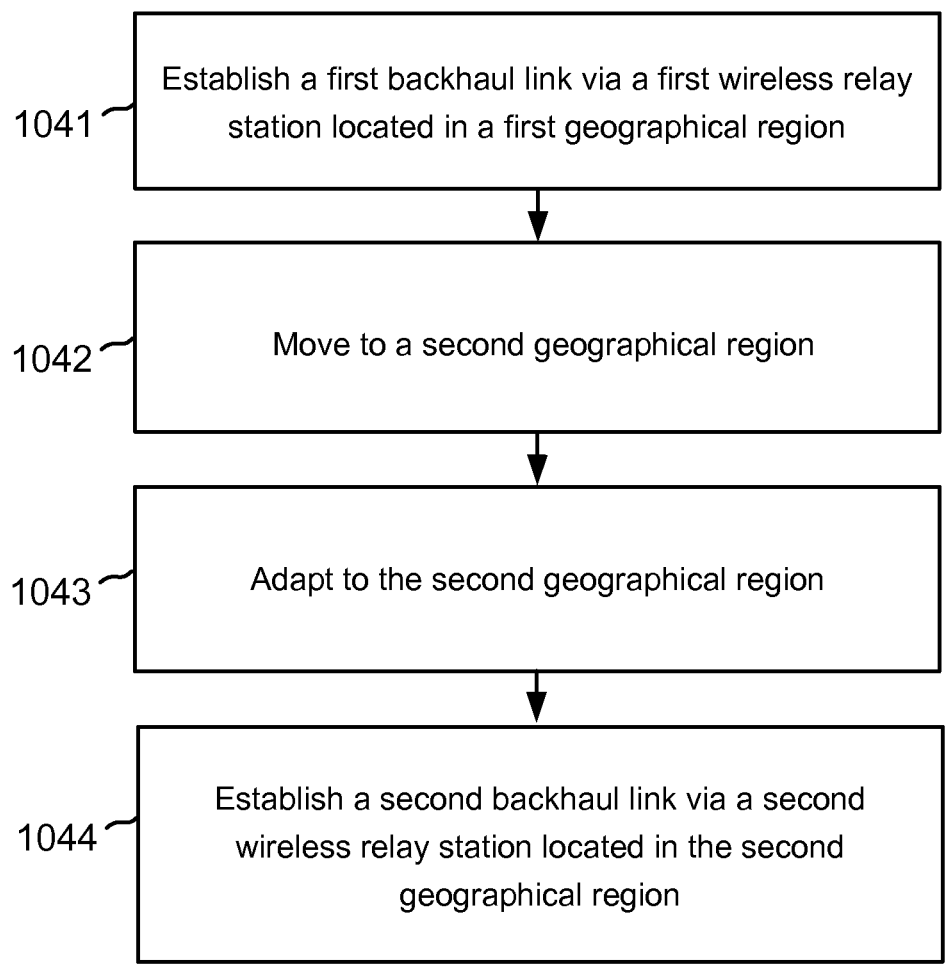
FIG. 18 illustrates one embodiment of a flow diagram describing one method for a base-station servicing one geographical region establishing a backhaul link with a first core network, moving the base-station to a second geographical region, and the base-station then establishing a second backhaul link with a second core network.

FIG. 18 illustrates one embodiment of a method for adapting a backhaul connection of a base-station in-motion. In step 1041: a first base-station 282 located on a first mobile platform 281 located in a first geographical region 10a, establishes a first backhaul link 282BK1 with a first core network 1CR, via a first wireless communication link 282WL1 connecting the first base-station 282 with a first relay station 288RL1 located in the first geographical region 10a. Communication between the first mobile platform 281 and the first relay station 288RL1 is performed using communication parameters set for the first wireless link 282WL1, and these communication parameters are associated with the first geographical region 10a. In step 1042: the first mobile platform 281 moves with the first base-station 282 from the first geographical region 10a to a second geographical region 10b. Also according to this embodiment, the first base-station 282 adapts its wireless link connection from the first set of parameters associated with the first geographical region 10a to a second set of communication parameters associated with the second geographical region 10b. Also according to this embodiment, the first base-station 282 establishes a second backhaul link 282BK2 with a second core network 2CR, via second wireless communication link 282WL2 connecting the first base-station 282 with a second relay station 288RL2 located in the second geographical region 10. To establish this second wireless communication link 288WL2, the first base-station 282 uses the second set of communication parameters associated with the second geographical region 10b.

In a first alternative embodiment to the method just described, further the move from the first geographical region 10a to the second geographical region 10b is by a substantially continuous movement by the mobile platform 282 that includes the first base-station 282. Further, the move also includes the first base-station 282 detecting that the base-station 282 has crossed from the first geographical region 10a to the second geographical region 10b. It is this movement which calls for adaptation of the set of communication parameters.

In a first variation to the first alternative embodiment just described, further the second geographical region 10b is set apart from the first geographical region 10a by different regulatory restrictions.

In a first configuration to the first variation just described, the first and second sets of communication parameters are associated, respectively, with a first set and a second set of regulatory restrictions, which are associated, respectively, with the first geographical region 10a and the second geographical regions 10b.

In a second alternative embodiment to the method described above for adapting a backhaul connection of a base-station in-motion to a new geographical region, further the first core network 1CR belongs to a first operator and the second core network 2CR belongs to a second operator.

In a third alternative embodiment to the method described above for adapting a backhaul connection of a base-station in-motion to a new geographical region, further the second core network 2CR is the same as the first core network 1CR.

In this description, numerous specific details are set forth. However, the embodiments/cases of the invention may be practiced without some of these specific details. In other instances, well-known hardware, materials, structures and techniques have not been shown in detail in order not to obscure the understanding of this description. In this description, references to "one embodiment" and "one case" mean that the feature being referred to may be included in at least one embodiment/case of the invention. Moreover, separate references to "one embodiment", "some embodiments", "one case", or "some cases" in this description do not necessarily refer to the same embodiment/case. Illustrated embodiments/cases are not mutually exclusive, unless so stated and except as will be readily apparent to those of ordinary skill in the art. Thus, the invention may include any variety of combinations and/or integrations of the features of the embodiments/cases described herein. Also herein, flow diagrams illustrate non-limiting embodiment/case examples of the methods, and block diagrams illustrate non-limiting embodiment/case examples of the devices. Some operations in the flow diagrams may be described with reference to the embodiments/cases illustrated by the block diagrams. However, the methods of the flow diagrams could be performed by embodiments/cases of the invention other than those discussed with reference to the block diagrams, and embodiments/cases discussed with reference to the block diagrams could perform operations different from those discussed with reference to the flow diagrams. Moreover, although the flow diagrams may depict serial operations, certain embodiments/cases could perform certain operations in parallel and/or in different orders from those depicted. Moreover, the use of repeated reference numerals and/or letters in the text and/or drawings is for the purpose of simplicity and clarity and does not in itself dictate a relationship between the various embodiments/cases and/or configurations discussed. Furthermore, methods and mechanisms of the embodiments/cases will sometimes be described in singular form for clarity. However, some embodiments/cases may include multiple iterations of a method or multiple instantiations of a mechanism unless noted otherwise. For example, when a controller or an interface are disclosed in an embodiment/case, the scope of the embodiment/case is intended to also cover the use of multiple controllers or interfaces.

Certain features of the embodiments/cases, which may have been, for clarity, described in the context of separate embodiments/cases, may also be provided in various combinations in a single embodiment/case. Conversely, various features of the embodiments/cases, which may have been, for brevity, described in the context of a single embodiment/case, may also be provided separately or in any suitable sub-combination. The embodiments/cases are not limited in their applications to the details of the order or sequence of steps of operation of methods, or to details of implementation of devices, set in the description, drawings, or examples. In addition, individual blocks illustrated in the figures may be functional in nature and do not necessarily correspond to discrete hardware elements. While the methods disclosed herein have been described and shown with reference to particular steps performed in a particular order, it is understood that these steps may be combined, subdivided, or reordered to form an equivalent method without departing from the teachings of the embodiments/cases. Accordingly, unless specifically indicated herein, the order and grouping of the steps is not a limitation of the embodiments/cases. Embodiments/cases described in conjunction with specific examples are presented by way of example, and not limitation. Moreover, it is evident that many alternatives, modifications and variations will be apparent to those skilled in the art. Accordingly, it is intended to embrace all such alternatives, modifications and variations that fall within the spirit and scope of the appended claims and their equivalents.

What is claimed is:

1. A method for adapting a base-station in-motion to a new geographical region, wherein said base-station comprises
    an RF power combiner,
    a plurality of backhaul antennas, a plurality of radio transceiver chains selectively coupled to said RF power combiner and said plurality of backhaul antennas, and
    a path interconnect to couple said plurality of radio transceiver chains to said plurality of backhaul antennas, said path interconnect configurable to connect any of said plurality of radio transceivers chains to any of said plurality of backhaul antennas;
    said method comprising:
    servicing wirelessly, by said base-station located in a first geographical region, a first group of wireless client devices, accessing a data base to obtain a first set of communication parameters associated with said first geographical region, said first set of communication parameters used to configure said path interconnect to connect a first set of radio transceiver chains to a first set of backhaul antennas;
    moving, by said base-station, from said first geographical region to a second geographical region;
    adapting, by said base-station, from said first set of communication parameters, to a second set of communication parameters, accessed from the data base, associated with said second geographical region, said second set of communication parameters used to configure said path interconnect to connect a second set of radio transceiver chains to a second set of backhaul antennas; and
    servicing wirelessly, by said base-station located in said second geographical region, a second group of wireless client devices, using said second set of communication parameters, after concluding that said servicing will not adversely affect said first geographical region,
    wherein said servicing wirelessly comprises utilizing the aggregate RF power of at least two of said plurality of radio transceiver chains to communicate with one of said first group of wireless client devices;
    wherein said base-station varies said second set of communication parameters and updating said second set of communication parameters in said data base to create a third set of communications parameters, said third set of communications parameters utilizing less resources than said second set of communication parameters while maintaining a service level, said third set of set of communications parameters replacing said second set of communication parameters in said data base.

2. The method of claim 1, wherein said moving is a continuous movement of said base-station, and further comprising:
    detecting, by said base-station, a crossing of said base-station from said first geographical region to said second geographical region, thereby evoking said adaptation.

3. The method of claim 1, wherein said first and second sets of communication parameters are associated, respectively, with a first set and a second set of regulatory restrictions, which are associated, respectively, with said first and second geographical regions.

4. The method of claim 1, wherein said adapting comprises: determining, by said base-station, presence in said second geographical region; and extracting, by said base-station, from a geographical data base, said second set of communication parameters, using said second geographical region determined.

5. The method of claim 1, wherein said adapting comprises: locating, by said base-station, a second base-station previously or currently servicing said second geographical region using said second set of communication parameters; and extracting, by said base-station, from said second base-station, said second set of communication parameters.

6. The method of claim 1, wherein said first and second sets of communication parameters are selected from a group consisting of: frequency, band, channel, transmit power, out of band emissions, communication protocol, communication standard, antenna gain, antenna type, beam width, and multiple antenna configuration.

7. The method of claim 1, wherein said concluding comprises simulating effect of said servicing on said first geographical region, using data comprising the position of said base-station from which said servicing takes place, and a first transmission radiation pattern associated with said base-station.

8. A transmission system in-motion to adapt to changing geographical regions and share resources between a radio access network and a backhaul network, comprising:
    a mobile transport platform operative to move between different geographical regions; and
    a base-station located onboard said mobile transport platforms, said base-station comprising;
    an RF power combiner,
    a plurality of radio transceiver chains,
        a plurality of backhaul antennas operating in a multiple-in-multiple-out (MIMO) configuration, said plurality of radio transceiver chains selectively coupled to said RF power combiner and said plurality of backhaul antennas, and
        a path interconnect to coupling said plurality of radio transceiver chains to said plurality of backhaul antennas, said path interconnect configurable to connect any of said plurality of radio transceivers chains to any of said plurality of backhaul antennas;
    wherein said base-station dynamically selects sets of communication parameters according to the location of said base-station relative to said geographical regions, said sets of communication parameters stored being accessed from a data base, said sets of communication parameters used to configure said path interconnect to connect a first set of radio transceiver chains to a first set of backhaul antennas, wherein each of said set of parameters is associated with one of said geographical regions;
    said base-station transmitting varying a parameter of said specific set of communication parameters and, when determining that said parameter requires less resources than said specific set of communication parameters while maintaining a service level, updating said parameter in said specific set of communication parameters;

said base-station transmitting wirelessly via a radio access network to a plurality of receivers located in a specific geographical region using a specific set of communication parameters associated with said specific geographical region, only after concluding that said transmission will not adversely affect any of the other said geographical regions;

said base-station establishing a first backhaul link with a core network, via a first wireless communication link connecting said base-station with a relay station; and said base-station sharing radio resources between said backhaul link and said radio access network, wherein said sharing comprises utilizing the aggregate RF power of at least two of said plurality of radio transceiver chains to communicate with one of said plurality of receivers.

9. The system of claim 8, wherein said mobile transport platform is seaborne.

10. The system of claim 8, wherein said sharing further comprises said path interconnect coupling said plurality of radio transceiver chains to one of said plurality of backhaul antennas combining the RF power of said plurality of radio transceiver chains into said one of said plurality of backhaul antennas.

11. The system of claim 10, wherein said combining the RF power of said plurality of radio transceiver chains into said one of said plurality of backhaul antennas increases the receiver sensitivity of said one of said plurality of backhaul antennas.

12. The system of claim 8, wherein said sharing further comprises said path interconnect coupling one of said plurality of radio transceiver chains to said plurality of backhaul antennas combining the RF power of said plurality of backhaul antennas into said one of said plurality of radio transceiver chains.

13. The system of claim 12, wherein said combining the RF power of said plurality of backhaul antennas into said one of said plurality of radio transceiver chains increases the receiver sensitivity of said one of said plurality of radio transceiver chains.

* * * * *